United States Patent
Shi et al.

(10) Patent No.: US 11,436,196 B2
(45) Date of Patent: Sep. 6, 2022

(54) ALARM LOG COMPRESSION METHOD, APPARATUS, AND SYSTEM, AND STORAGE MEDIUM

(71) Applicant: HUAWEI TECHNOLOGIES CO., LTD., Guangdong (CN)

(72) Inventors: Jiyuan Shi, Nanjing (CN); Liang Zhang, Nanjing (CN); Shihao Li, Shenzhen (CN); Dewei Bao, Nanjing (CN); Jian Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/077,638

(22) Filed: Oct. 22, 2020

(65) Prior Publication Data
US 2021/0042270 A1 Feb. 11, 2021

Related U.S. Application Data

(63) Continuation of application No. PCT/CN2018/124144, filed on Dec. 27, 2018.

(30) Foreign Application Priority Data

Apr. 23, 2018 (CN) .......................... 201810370889.0

(51) Int. Cl.
*G06F 17/00* (2019.01)
*G06F 16/174* (2019.01)
(Continued)

(52) U.S. Cl.
CPC ...... *G06F 16/1744* (2019.01); *G06F 16/2465* (2019.01); *G06F 16/285* (2019.01);
(Continued)

(58) Field of Classification Search
None
See application file for complete search history.

(56) References Cited

U.S. PATENT DOCUMENTS

| 6,230,153 | B1 | 5/2001 | Howard et al. |
| 7,389,345 | B1* | 6/2008 | Adams ................ H04L 43/0817 709/224 |

(Continued)

FOREIGN PATENT DOCUMENTS

| CN | 101325520 A | 12/2008 |
| CN | 102158355 A | 8/2011 |

(Continued)

OTHER PUBLICATIONS

Qiao Juan, Application of Data Mining in Telecommunication Network Alarm Correlation Research, Huazhong Agricultural University, 2010, 2 pages (abstract).

(Continued)

*Primary Examiner* — Hasanul Mobin
(74) *Attorney, Agent, or Firm* — Womble Bond Dickinson (US) LLP

(57) ABSTRACT

An alarm log compression method, apparatus, system, and a storage medium are provided. The method includes: obtaining a historical alarm log set generated by a first network device; dividing the historical alarm log set into a plurality of historical alarm log subsets based on a generation time stamp of a historical alarm log in the historical alarm log set, where all historical alarm logs in each historical alarm log subset are consecutive in a time sequence; determining a correspondence between an alarm type in the historical alarm log set and the plurality of historical alarm log subsets; performing clustering processing on the alarm types in the historical alarm log set based on the correspondence, to generate at least one association rule; and compressing (Continued)

to-be-processed alarm logs based on the at least one association rule, to obtain an alarm log whose alarm type is a root cause alarm type.

20 Claims, 10 Drawing Sheets

(51) Int. Cl.
 G06F 16/28 (2019.01)
 G06F 16/2458 (2019.01)
 H04L 41/0631 (2022.01)
 H04L 41/069 (2022.01)

(52) U.S. Cl.
 CPC ........ *H04L 41/069* (2013.01); *H04L 41/0631* (2013.01); *G06F 2216/03* (2013.01)

(56) References Cited

U.S. PATENT DOCUMENTS

| | | | |
|---|---|---|---|
| 9,923,757 B1* | 3/2018 | Hester | H04L 63/1441 |
| 2007/0150690 A1* | 6/2007 | Chen | G06F 3/0644 |
| | | | 711/170 |
| 2007/0192262 A1* | 8/2007 | Marianetti | G06N 3/049 |
| | | | 706/12 |
| 2008/0205280 A1* | 8/2008 | Saphir | G06N 3/049 |
| | | | 370/236 |
| 2008/0208915 A1* | 8/2008 | George | G06N 20/00 |
| 2009/0150311 A1* | 6/2009 | George | G06N 3/049 |
| | | | 706/12 |
| 2013/0069792 A1* | 3/2013 | Blevins | G06F 17/16 |
| | | | 703/2 |
| 2017/0294112 A1* | 10/2017 | Kushnir | G08B 29/02 |

FOREIGN PATENT DOCUMENTS

| | | |
|---|---|---|
| CN | 105528280 A | 4/2016 |
| CN | 106055608 A | 10/2016 |
| CN | 106100885 A | 11/2016 |
| CN | 107181604 A | 9/2017 |
| CN | 107231258 A | 10/2017 |
| CN | 107391746 A | 11/2017 |
| CN | 107426022 A | 12/2017 |
| CN | 107770797 A | 3/2018 |
| CN | 107835087 A | 3/2018 |
| CN | 107844514 A | 3/2018 |
| JP | 2009059112 A | 3/2009 |
| JP | 2016143388 A | 8/2016 |
| RU | 2615790 C1 | 4/2017 |
| WO | 2016208158 A1 | 12/2016 |
| WO | 2017082782 A1 | 5/2017 |

OTHER PUBLICATIONS

Wu Bin et al,"Analysis of Alert Correlation in Honeynet", Journal of Beijing Univ ersity of Posts and Telecommunications, vol. 31 No. 6, Dec. 2008, total 4 pages. With an English Abstract.

Ye Zhen et al,"Data mining-based alert message analysis system for NIDS", Journal of Hefei Universit Y of Technology, vol. 28 No. 1, Jan. 2005, total 4 pages. With an English Abstract.

He Xue-dong,"Security Event Management System in the achievement Correlation analysis engine", Link Trust Technologies Development Co.Ltd, Nanjing 210029, P.R.China, total 3 pages. With an English Abstract.

Yangyang Wu et al, Mining Alarm Database of Telecommunication Network for Alarm Association Rules, Dec. 2005, XP010902839, 6 pages.

F. Yang et al, Improved correlation analysis and visualization of industrial alarm data, ISA Transactions, Apr. 2012, 8 pages, XP055382206.

* cited by examiner

Information about a log 4169 ###############################################
#######################
(Host name: dgd437slhw3m-spefic instance: =10GE1/0/29)
Quantity of occurrence times: 2
First occurrence time: 2017-10-13 16:08:02
Final occurrence time: 2017-10-13 16:08:25
Root-cause log: CID=0x807a0405-alarmID=0x08520003; The interface status changes.
(ifName=10GE1/0/29, AdminStatus=UP, OperStatus=DOWN, Reason=Interface physical link is down,
mainIfname=10GE1/0/29) #015

M

Information about a log 4170 ###############################################
#######################
(Host name: dgd414slhweg-specific instance: =10GE1/0/9)
Quantity of occurrence times: 5
First occurrence time: 2017-09-22 06:43:34
Final occurrence time: 2017-09-22 06:47:51
Root-cause log: CID=0x807a0405-alarmID=0x08520003; The interface status changes.
(ifName=10GE1/0/9, AdminStatus=UP, OperStatus=DOWN, Reason=Interface physical link is down,
mainIfname=10GE1/0/9) #015

Information about a log 4171 ###############################################
#######################
(Host name: dgd414slhweg-specific instance: =10GE1/0/6)
Quantity of occurrence times: 3
First occurrence time: 2017-09-19 10:26:58
Final occurrence time: 2017-09-19 10:30:03
Root-cause log: CID=0x807a0405-alarmID=0x08520003; The interface status changes.
(ifName=10GE1/0/6, AdminStatus=UP, OperStatus=DOWN, Reason=Interface physical link is down,
mainIfname=10GE1/0/6) #015

FIG. 5B

ALARM LOG COMPRESSION METHOD, APPARATUS, AND SYSTEM, AND STORAGE MEDIUM

CROSS-REFERENCE TO RELATED APPLICATIONS

This application is a continuation of International Application No. PCT/CN2018/124144, filed on Dec. 27, 2018, which claims priority to Chinese Patent Application No. 201810370889.0, filed on Apr. 23, 2018. The disclosures of the aforementioned applications are hereby incorporated by reference in their entireties.

TECHNICAL FIELD

This disclosure relates to the field of communications technologies, and in particular, to an alarm log compression method, apparatus, and system, and a storage medium.

BACKGROUND

A communications network includes a large quantity of network devices. These network devices generate a large quantity of alarm logs every day. The alarm log is information generated by the network device due to a fault. The alarm log usually includes information such as an identifier of the network device that generates the alarm log, an alarm type (used to indicate the fault that occurs on the network device), and a generation time stamp of the alarm log. Each network device reports a generated alarm log to an alarm log processing device. A network monitoring engineer analyzes the alarm log on the alarm log processing device, finds a problem existing in the communications network, and feeds back the problem to a network maintenance engineer for processing.

With rapid development of communications technologies, various types of communications networks are increasing in scale currently, structures of the communications networks are increasingly complex, and the types and quantity of network devices in the communications networks are increasing. The large quantity of network devices generate massive alarm logs, and most of the alarm logs are invalid or redundant alarm logs. If all the alarm logs generated by the network devices are presented to the network monitoring engineer, the analysis workload of the network monitoring engineer is heavy. Consequently, the alarm logs cannot be effectively monitored and analyzed, and a problem existing in the network cannot be located in a timely manner. Therefore, to improve work efficiency of the network monitoring engineer, it is necessary to compress the alarm logs effectively and filter out some invalid or redundant alarm logs, to reduce a quantity of alarm logs presented to the network monitoring engineer.

SUMMARY

One possible solution for alarm log compression includes: mining a historical alarm log according to an automatic frequent itemset mining method, to establish an association rule between different alarm types; then determining, by a professional technician, accuracy of the association rule, and determining a root cause alarm type and a minor alarm type in each association rule; and after alarm logs are generated, representing, to a network monitoring engineer based on a predetermined association rule, an alarm log whose alarm type is the root cause alarm type, and filtering out an alarm log of a minor alarm type, to compress the alarm logs. In a same association rule, a fault that occurs on a network device and that is indicated by the minor alarm type is caused by a fault that occurs on the network device and that is indicated by the root cause alarm type.

However, according to the solution, in a process of establishing the association rule between different alarm types according to the automatic frequent itemset mining method, to determine a frequent itemset, historical alarm logs should be traversed for a plurality of times. When there is a large quantity of historical alarm logs, mining efficiency is relatively low. In addition, because some alarm types occur at a relatively low frequency in an actual application, to implement comprehensiveness of establishing association rules for different alarm types, a support degree of the frequent itemset should be set to be relatively low. A lower support degree results in a larger quantity of determined frequent itemsets, and a larger quantity of association rules established based on the frequent itemsets. Therefore, a relatively low support degree leads to a large quantity of association rules obtained through mining. Consequently, time costs are relatively large in a process of determining accuracy of an association rule and a process of determining a root cause alarm type in the association rule.

An embodiment of this disclosure provide an alarm log compression method, apparatus, and system, and a storage medium, to resolve a problem that association rule mining efficiency is relatively low and time costs are relatively high in a related technology. The technical solutions are as follows.

According to an embodiment, this disclosure provides an alarm log compression method, applied to a compression device, and the method includes:

obtaining a historical alarm log set generated by a first network device in a communications network, where the historical alarm log set includes a plurality of historical alarm logs, and each historical alarm log includes an alarm type and a generation time stamp;

dividing the historical alarm log set into a plurality of historical alarm log subsets based on the generation time stamps of the historical alarm logs in the historical alarm log set, where all historical alarm logs in each historical alarm log subset are consecutive in a time sequence, and a union set of the plurality of historical alarm log subsets includes all the historical alarm logs in the historical alarm log set;

determining a correspondence between an alarm type in the historical alarm log set and the plurality of historical alarm log subsets;

performing clustering processing on the alarm types in the historical alarm log set based on the correspondence, to generate at least one association rule, where each association rule includes a root cause alarm type and at least one minor alarm type that are associated with each other; and compressing a plurality of to-be-processed alarm logs based on the at least one association rule, to obtain an alarm log whose alarm type is the root cause alarm type.

It should be noted that in this disclosure, the historical alarm log set is divided into the plurality of historical alarm log subsets based on the generation time stamps of the historical alarm logs. Because all the historical alarm logs in each historical alarm log subset are consecutive in the time sequence, a temporal correlation between alarm types may be obtained based on each historical alarm log subset, to mine the association rule. In a mining process, only alarm types in the plurality of historical alarm log subsets obtained through division performed based on the generation time stamp should be traversed, then a correspondence between each alarm type and the plurality of historical alarm log subsets is determined, and clustering processing may be performed on the alarm type based on the correspondence, to generate the association rule. In comparison with a related technology, in this disclosure, the historical alarm logs do not need to be traversed for a plurality of times, and association rule mining efficiency is improved. In addition, in this disclosure, a quantity of association rules mined based on the temporal correlation between the alarm types is far less than a quantity of association rules mined based on a frequent itemset in the related technology. Therefore, time costs are reduced in a process of determining accuracy of an association rule and a process of determining a root cause alarm type in the association rule.

Optionally, the determining a correspondence between an alarm type in the historical alarm log set and the plurality of historical alarm log subsets includes:

obtaining all alarm types in the historical alarm log set, to obtain a first alarm type set; and determining a time sequence vector of each alarm type in the first alarm type set, where each time sequence vector is used to reflect a correspondence between a corresponding alarm type and the plurality of historical alarm log subsets, where for the time sequence vector corresponding to each alarm type, values in the time sequence vector are in a one-to-one correspondence with the plurality of historical alarm log subsets, the values in the time sequence vector include at least one of a first value and a second value, the first value is used to indicate that the alarm type exists in a corresponding historical alarm log subset, the second value is used to indicate that the alarm type does not exist in a corresponding historical alarm log subset, and the first value is different from the second value.

The determining a time sequence vector of each alarm type in the first alarm type set includes:

executing a time sequence vector determining procedure for each alarm type in the first alarm type set.

The time sequence vector determining procedure includes:

sequentially detecting whether the alarm type exists in the plurality of historical alarm log subsets; and determining the time sequence vector of the alarm type based on a detection result.

Correspondingly, the performing clustering processing on the alarm types in the historical alarm log set based on the correspondence, to generate at least one association rule includes:

performing clustering processing on all the alarm types in the first alarm type set based on the time sequence vectors of all the alarm types, to generate the at least one association rule.

It should be noted that a time window is obtained through division and the time sequence vector of the alarm type is established, to determine a correspondence between each alarm type and the plurality of historical alarm log subsets. The method is simple and efficient.

A first method for performing clustering processing on all the alarm types in the first alarm type set based on the time sequence vectors of all the alarm types, to generate the at least one association rule includes:

performing a clustering operation on the first alarm type set, where the clustering operation includes:

setting a target alarm type set and a second alarm type set, where both the target alarm type set and the second alarm type set are empty sets;

adding any alarm type in the first alarm type set to the target alarm type set, and deleting, from the first alarm type set, the alarm type added to the target alarm type set;

performing a determining procedure repeatedly until the first alarm type set becomes an empty set, and determining the target alarm type set as an association rule; and after the performing a determining procedure repeatedly, when the second alarm type set is not an empty set, performing the clustering operation repeatedly by using the second alarm type set as a new first alarm type set; or after the performing a determining procedure repeatedly, when the second alarm type set is an empty set, stopping performing the clustering operation.

The determining procedure includes:

calculating a correlation between a to-be-processed alarm type and the target alarm type set based on a time sequence vector of the to-be-processed alarm type and time sequence vectors of all alarm types in the target alarm type set, where the to-be-processed alarm type is any alarm type in the first alarm type set other than the alarm types in the target alarm type set; and when the correlation is greater than a preset correlation threshold, adding the to-be-processed alarm type to the target alarm type set, to obtain an updated target alarm type set, and deleting the to-be-processed alarm type from the first alarm type set; or when the correlation is not greater than a preset correlation threshold, adding the to-be-processed alarm type to the second alarm type set, and deleting the to-be-processed alarm type from the first alarm type set.

A second method for performing clustering processing on all the alarm types in the first alarm type set based on the time sequence vectors of all the alarm types, to generate the at least one association rule includes:

marking a target alarm type in the first alarm type set, where the target alarm type is any alarm type in the first alarm type set; and performing a clustering operation on the first alarm type set, where the clustering operation includes:

executing a determining procedure repeatedly until all the alarm types in the first alarm type set are traversed; and after the executing a determining procedure repeatedly, when there is an alarm type for which no mark is set in the first alarm type set, determining, as a new target alarm type, any alarm type for which no mark is set, marking the new target alarm type, and performing the clustering operation repeatedly, where different target alarm types have different marks; or after the executing a determining procedure repeatedly, when there is no alarm type for which no mark is set in the first alarm type set, stopping performing the clustering operation, and generating the at least one association rule based on the first alarm type set, where a same mark is set for all alarm types in each association rule.

The determining procedure includes:

determining, as a target alarm type set, a set including all alarm types in the first alarm type set that have the same mark as the target alarm type;

calculating a correlation between a to-be-processed alarm type and the target alarm type set based on a time sequence vector of the to-be-processed alarm type and time sequence vectors of all the alarm types in the target alarm type set, where the to-be-processed alarm type is any alarm type in the first alarm type set other than the alarm types in the target alarm type set; and marking the to-be-processed alarm type when the correlation is greater than a preset correlation threshold, where a mark of the to-be-processed alarm type is the same as a mark of the target alarm type.

Optionally, the calculating a correlation between a to-be-processed alarm type and the target alarm type set based on a time sequence vector of the to-be-processed alarm type and time sequence vectors of all alarm types in the target alarm type set includes:

calculating a correlation between the to-be-processed alarm type and each alarm type in the target alarm type set according to a Pearson correlation coefficient formula, where the Pearson correlation coefficient formula is:

$$Cor(i_i, i_j) = \frac{cov(v_i, v_j)}{\sigma_{v_i}, \sigma_{v_j}},$$

where $Cor(i_i, i_j)$ represents a correlation between an alarm type $i_i$ and an alarm type $i_j$, $cov(v_i, v_j)$ represents a covariance between $v_i$ and $v_j$, $\sigma_{v_i}$ represents a standard deviation of $v_i$, $\sigma_{v_j}$ represents a standard deviation of $v_j$, $v_i$ represents a time sequence vector of the alarm type $i_i$, and $v_j$ represents a time sequence vector of the alarm type $i_j$; and calculating the correlation between the to-be-processed alarm type and the target alarm type set based on the correlation between the to-be-processed alarm type and each alarm type in the target alarm type set according to an average correlation calculation formula, where the average correlation calculation formula is:

$$AveCor(i_j, R) = \frac{\sum_{i_j \in R} Cor(i_i, i_j)}{|R|},$$

where $AveCor(i_j, R)$ indicates a correlation between the alarm type $i_j$ and a target alarm type set R, and |R| indicates a quantity of alarm types in the target alarm type set R.

Optionally, the obtaining a historical alarm log set generated by a first network device in a communications network includes:

preprocessing a historical alarm log generated by the first network device in a first preset time period, to remove redundant information from each historical alarm log, to obtain the historical alarm log set.

Optionally, each historical alarm log is represented in a 2-tuple (M, t) format, M represents alarm log information, t represents a generation time stamp, and the alarm log information includes at least an alarm type field and an identifier field of the first network device.

Optionally, historical alarm logs in the historical alarm log set have a time deviation relationship, and the dividing the historical alarm log set into a plurality of historical alarm log subsets based on the generation time stamps of the historical alarm logs in the historical alarm log set by using a sliding window technique includes:

obtaining a generation time stamp set of the historical alarm logs in the historical alarm log set; and classifying the historical alarm logs into the plurality of historical alarm log subsets based on the generation time stamp set, a preset time window length, and a window sliding step by using the sliding window technique, where the window sliding step is not greater than the time window length.

Further, the method further includes:

obtaining a to-be-processed alarm log set generated by a second network device in the communications network in a second preset time period, where the to-be-processed alarm log set includes the plurality of to-be-processed alarm logs, and each to-be-processed alarm log includes an alarm type and a generation time stamp; and generating at least one alarm event based on the to-be-processed alarm log set, where each alarm event is used to indicate alarm logs of a same alarm type that are generated by the second network device.

It should be noted that when the alarm event is being reconstructed, statistics about alarm log information may be collected at a granularity of the alarm event, thereby improving accuracy and reliability of the alarm log information obtained through statistics collection.

Optionally, the generating at least one alarm event based on the to-be-processed alarm log set includes:

for each alarm type in the to-be-processed alarm log set, obtaining a target alarm log that is in the to-be-processed alarm log set and that is of the alarm type; separately calculating an occurrence time interval between every two target alarm logs in the to-be-processed alarm log set that are adjacent in the time sequence; and reconstructing, into one alarm event based on the occurrence time interval between every two target alarm logs, target alarm logs in the to-be-processed alarm log set that belong to a same alarm event.

Optionally, the reconstructing, into one alarm event based on the occurrence time interval between every two target alarm logs, target alarm logs in the to-be-processed alarm log set that belong to a same alarm event includes:

calculating an estimated time interval between two target alarm logs by using an exponential moving average method, where the two target alarm logs are any two target alarm logs that are adjacent in the time sequence, the two target alarm logs include a first alarm log and a second alarm log, and the first alarm log is generated before the second alarm log;

determining whether the occurrence time interval between the two target alarm logs and the estimated time interval meet a preset condition; and when the occurrence time interval between the two target alarm logs and the estimated time interval meet the preset condition, determining that the second alarm log belongs to an alarm event to which the first alarm log belongs, and aggregating the second alarm log into the alarm event to which the first alarm log belongs; or when the occurrence time interval between the two target alarm logs and the estimated time interval do not meet the preset condition, determining that the second alarm log does not belong to an alarm event to which the first alarm log belongs.

Optionally, the occurrence time interval $s_k$ between the two target alarm logs is $s_k=t_k-t_{k-1}$, the estimated time interval $s_k'$ is $s_k'=\alpha*s_{k-1}+(1-\alpha)*s'_{k-1}$, and the preset condition is $s_k \leq \beta*s_k'$, where $t_k$ is a generation time stamp of the second alarm log, $t_{k-1}$ is a generation time stamp of the first alarm log, $0 \leq \alpha \leq 1$, k is an integer greater than 1, and $\beta$ is a positive number.

It should be noted that before the determining whether the occurrence time interval between the two target alarm logs and the estimated time interval meet a preset condition, the method further includes:

when the occurrence time interval between the two target alarm logs is less than or equal to a preset minimum time interval threshold, determining that the second alarm log belongs to the alarm event to which the first alarm log belongs; or when the occurrence time interval between the two target alarm logs is greater than a preset maximum time interval threshold, determining that the second alarm log does not belong to the alarm event to which the first alarm log belongs, where $s_{min} \leq \beta * s_k^t \leq s_{max}$, $s_{min}$ is the minimum time interval threshold, and $s_{max}$ is the maximum time interval threshold.

Further, after the determining that the second alarm log does not belong to the alarm event to which the first alarm log belongs, the method further includes:

ending reconstruction of the alarm event to which the first alarm log belongs, and initializing a new alarm event; and aggregating the second alarm log into the new alarm event.

Optionally, the alarm event includes the alarm type, and at least one of a start occurrence moment, an end occurrence moment, an average occurrence time interval, and a quantity of occurrence times of the alarm log in the alarm event.

The compressing a plurality of to-be-processed alarm logs based on the at least one association rule, to obtain an alarm log whose alarm type is the root cause alarm type includes:

compressing the at least one alarm event based on the at least one association rule, to obtain at least one target alarm event, where each target alarm event is used to indicate an alarm log whose alarm type is the root cause alarm type.

Correspondingly, after the compressing the at least one alarm event, to obtain at least one target alarm event, the method further includes:

outputting the at least one target alarm event, to display the at least one target alarm event to a network monitoring engineer.

According to an embodiment, this disclosure provides an alarm log compression apparatus, applied to a compression device, and the apparatus includes:

a first obtaining module, configured to obtain a historical alarm log set generated by a first network device in a communications network, where the historical alarm log set includes a plurality of historical alarm logs, and each historical alarm log includes an alarm type and a generation time stamp;

a division module, configured to divide the historical alarm log set into a plurality of historical alarm log subsets based on the generation time stamps of the historical alarm logs in the historical alarm log set, where all historical alarm logs in each historical alarm log subset are consecutive in a time sequence, and a union set of the plurality of historical alarm log subsets includes all the historical alarm logs in the historical alarm log set;

a determining module, configured to determine a correspondence between an alarm type in the historical alarm log set and the plurality of historical alarm log subsets;

a clustering module, configured to perform clustering processing on the alarm types in the historical alarm log set based on the correspondence, to generate at least one association rule, where each association rule includes a root cause alarm type and at least one minor alarm type that are associated with each other; and a compression module, configured to compress a plurality of to-be-processed alarm logs based on the at least one association rule, to obtain an alarm log whose alarm type is the root cause alarm type.

Optionally, the determining module includes:

an obtaining submodule, configured to obtain all alarm types in the historical alarm log set, to obtain a first alarm type set; and a determining submodule, configured to determine a time sequence vector of each alarm type in the first alarm type set, where each time sequence vector is used to reflect a correspondence between a corresponding alarm type and the plurality of historical alarm log sub sets.

For the time sequence vector corresponding to each alarm type, values in the time sequence vector are in a one-to-one correspondence with the plurality of historical alarm log subsets, the values in the time sequence vector include at least one of a first value and a second value, the first value is used to indicate that the alarm type exists in a corresponding historical alarm log subset, the second value is used to indicate that the alarm type does not exist in a corresponding historical alarm log subset, and the first value is different from the second value.

Optionally, the determining submodule is configured to:

execute a time sequence vector determining procedure for each alarm type in the first alarm type set.

The time sequence vector determining procedure includes:

sequentially detecting whether the alarm type exists in the plurality of historical alarm log subsets; and determining the time sequence vector of the alarm type based on a detection result.

Optionally, the clustering module is configured to:

perform clustering processing on all the alarm types in the first alarm type set based on the time sequence vectors of all the alarm types, to generate the at least one association rule.

Optionally, the clustering module is further configured to:

perform a clustering operation on the first alarm type set, where the clustering operation includes:

setting a target alarm type set and a second alarm type set, where both the target alarm type set and the second alarm type set are empty sets;

adding any alarm type in the first alarm type set to the target alarm type set, and deleting, from the first alarm type set, the alarm type added to the target alarm type set;

performing a determining procedure repeatedly until the first alarm type set becomes an empty set, and determining the target alarm type set as an association rule; and after the performing a determining procedure repeatedly, when the second alarm type set is not an empty set, performing the clustering operation repeatedly by using the second alarm type set as a new first alarm type set; or after the performing a determining procedure repeatedly, when the second alarm type set is an empty set, stopping performing the clustering operation.

The determining procedure includes:

calculating a correlation between a to-be-processed alarm type and the target alarm type set based on a time sequence vector of the to-be-processed alarm type and time sequence vectors of all alarm types in the target alarm type set, where the to-be-processed alarm type is any alarm type in the first alarm type set other than the alarm types in the target alarm type set; and when the correlation is greater than a preset correlation threshold, adding the to-be-processed alarm type to the target alarm type set, to obtain an updated target alarm type set, and deleting the to-be-processed alarm type from the first alarm type set; or when the correlation is not greater than the preset correlation threshold, adding the to-be-processed alarm type to the second alarm type set, and deleting the to-be-processed alarm type from the first alarm type set.

Optionally, the clustering module is further configured to:

mark a target alarm type in the first alarm type set, where the target alarm type is any alarm type in the first alarm type set; and perform a clustering operation on the first alarm type set, where the clustering operation includes:

execute a determining procedure repeatedly until all the alarm types in the first alarm type set are traversed; and after the executing a determining procedure repeatedly, when there is an alarm type for which no mark is set in the first alarm type set, determine, as a new target alarm type, any alarm type for which no mark is set, mark the new target alarm type, and perform the clustering operation repeatedly, where different target alarm types have different marks; or after the executing a determining procedure repeatedly, when there is no alarm type for which no mark is set in the first alarm type set, stop performing the clustering operation, and generate the at least one association rule based on the first alarm type set, where a same mark is set for all alarm types in each association rule.

The determining procedure includes:

determining, as a target alarm type set, a set including all alarm types in the first alarm type set that have the same mark as the target alarm type;

calculating a correlation between a to-be-processed alarm type and the target alarm type set based on a time sequence vector of the to-be-processed alarm type and time sequence vectors of all the alarm types in the target alarm type set, where the to-be-processed alarm type is any alarm type in the first alarm type set other than the alarm types in the target alarm type set; and marking the to-be-processed alarm type when the correlation is greater than a preset correlation threshold, where a mark of the to-be-processed alarm type is the same as a mark of the target alarm type.

Optionally, the clustering module is further configured to:

calculate a correlation between the to-be-processed alarm type and each alarm type in the target alarm type set according to a Pearson correlation coefficient formula, where the Pearson correlation coefficient formula is:

$$Cor(i_i, i_j) = \frac{cov(v_i, v_j)}{\sigma_{v_i}, \sigma_{v_j}},$$

where $Cor(i_i, i_j)$ represents a correlation between an alarm type $i_i$ and an alarm type $i_j$, $cov(v_i, v_j)$ represents a covariance between $v_i$ and $v_j$, $\sigma_{v_i}$ represents a standard deviation of $v_i$, $\sigma_{v_j}$ represents a standard deviation of $v_j$, $v_i$ represents a time sequence vector of the alarm type $i_i$, and $v_j$ represents a time sequence vector of the alarm type $i_j$; and calculate the correlation between the to-be-processed alarm type and the target alarm type set based on the correlation between the to-be-processed alarm type and each alarm type in the target alarm type set according to an average correlation calculation formula, where the average correlation calculation formula is:

$$AveCor(i_j, R) = \frac{\sum_{i_j \in R} Cor(i_i, i_j)}{|R|},$$

where $AveCor(i_j, R)$ indicates a correlation between the alarm type $i_j$ and a target alarm type set R, and $|R|$ indicates a quantity of alarm types in the target alarm type set R.

Optionally, the first obtaining module is configured to:

preprocess a historical alarm log generated by the first network device in a first preset time period, to remove redundant information from each historical alarm log, to obtain the historical alarm log set.

Optionally, each historical alarm log is represented in a 2-tuple (M, t) format, M represents alarm log information, t represents a generation time stamp, and the alarm log information includes at least an alarm type field and an identifier field of an alarm network device.

Optionally, the historical alarm logs in the historical alarm log set have a time partial order relation, and the division submodule is configured to:

obtain a generation time stamp set of the historical alarm logs in the historical alarm log set; and classify the historical alarm logs into the plurality of historical alarm log subsets based on the generation time stamp set, a preset time window length, and a window sliding step, where the window sliding step is not greater than the time window length.

Optionally, the apparatus further includes:

a second obtaining module, configured to obtain a to-be-processed alarm log set generated by a second network device in the communications network in a second preset time period, where the to-be-processed alarm log set includes the plurality of to-be-processed alarm logs, and each to-be-processed alarm log includes an alarm type and a generation time stamp; and a generation module, configured to generate at least one alarm event based on the to-be-processed alarm log set, where each alarm event is used to indicate alarm logs of a same alarm type that are generated by the second network device.

Optionally, the generation module includes:

a reconstruction submodule, configured to execute an alarm event reconstruction procedure for each to-be-processed alarm log set, where the alarm event reconstruction process includes:

an obtaining unit is configured to: for each alarm type in the to-be-processed alarm log set, obtain a target alarm log that is in the to-be-processed alarm log set and that is of the alarm type;

a calculation unit is configured to separately calculate an occurrence time interval between every two target alarm logs in the to-be-processed alarm log set that are adjacent in the time sequence; and a reconstruction unit is configured to reconstruct, into one alarm event based on the occurrence time interval between every two target alarm logs, target alarm logs in the to-be-processed alarm log set that belong to a same alarm event.

Optionally, the reconstruction unit is configured to:

calculate an estimated time interval between two target alarm logs by using an exponential moving average method, where the two target alarm logs are any two target alarm logs that are adjacent in the time sequence, the two target alarm logs include a first alarm log and a second alarm log, and the first alarm log is generated before the second alarm log;

determine whether the occurrence time interval between the two target alarm logs and the estimated time interval meet a preset condition; and when the occurrence time interval between the two target alarm logs and the estimated time interval meet the preset condition, determine that the second alarm log belongs to an alarm event to which the first alarm log belongs, and aggregate the second alarm log into the alarm event to which the first alarm log belongs; or when the occurrence time interval between the two target alarm logs and the estimated time interval do not meet the preset condition, determine that the second alarm log does not belong to an alarm event to which the first alarm log belongs.

Optionally, the occurrence time intervalsk between the two target alarm logs is $s_k=t_k-t_{k-1}$, the estimated time interval $s_k'$ is $s_k'=\alpha*s_{k-1}+(1-\alpha)*s'_{k-1}$ and the preset condition is $s_k \leq \beta*s_k'$, where $t_k$ is a generation time stamp of the second alarm log, $t_{k-1}$ is a generation time stamp of the first alarm log, $0 \leq \alpha \leq 1$, k is an integer greater than 1, and $\beta$ is a positive number.

Optionally, the reconstruction unit is further configured to:

when the occurrence time interval between the two target alarm logs is less than or equal to a preset minimum time interval threshold, determine that the second alarm log belongs to the alarm event to which the first alarm log belongs; or when the occurrence time interval between the two target alarm logs is greater than a preset maximum time interval threshold, determine that the second alarm log does not belong to the alarm event to which the first alarm log belongs, where $s_{min} \leq \beta s_k' \leq s_{max}$, $s_{min}$ is the minimum time interval threshold, and $s_{max}$ is the maximum time interval threshold.

Optionally, the reconstruction unit is further configured to:

end reconstruction of the alarm event to which the first alarm log belongs, and initialize a new alarm event; and aggregate the second alarm log into the new alarm event.

Optionally, the alarm event includes the alarm type, and at least one of a start occurrence moment, an end occurrence moment, an average occurrence time interval, and a quantity of occurrence times of the alarm log in the alarm event.

Optionally, the compression module is configured to:

compress the at least one alarm event based on the at least one association rule, to obtain at least one target alarm event, where each target alarm event is used to indicate an alarm log whose alarm type is the root cause alarm type.

Optionally, the apparatus further includes:

an output module, configured to output the at least one target alarm event, to display the at least one target alarm event to a network monitoring engineer.

Optionally, the second network device and the first network device are a same network device; or the second network device and the first network device are different network devices of a same type.

According to an embodiment, this disclosure provides an alarm log compression system, where the system includes a compression device, and the compression device includes the apparatus according to the second aspect; and the compression device is configured to compress a plurality of alarm logs generated by at least one network device in a communications network.

Optionally, the compression device is further configured to display alarm information obtained after the plurality of alarm logs are compressed.

Optionally, the system further includes a network management device;

the compression device is further configured to output, to the network management device, the alarm information obtained after the plurality of alarm logs are compressed; and the network management device is configured to display the alarm information.

Optionally, the alarm information is displayed in a form of a chart.

According to an embodiment, this disclosure provides an alarm log compression apparatus, where the apparatus includes a memory, a processor, and a computer program that is stored in the memory and that can be run on the processor, and when the processor executes the computer program, the alarm log compression method according to the first aspect is implemented.

According to an embodiment, this disclosure provides a computer-readable storage medium, where the computer-readable storage medium stores an instruction, and when the instruction is executed by a processor, the alarm log compression method according to the first aspect is implemented.

Beneficial effects brought by the technical solutions provided in the embodiments of this disclosure include at least the following:

In conclusion, according to the alarm log compression method, apparatus, and system, and the storage medium provided in the embodiments of this disclosure, the association rule is mined based on a temporal correlation between alarm types. In a mining process, only alarm types in the plurality of historical alarm log subsets obtained through division performed based on the generation time stamp should be traversed, and then a correspondence between each alarm type and the plurality of historical alarm log subsets is determined, for example, after the time sequence vector of each alarm type is determined, clustering processing may be performed on the alarm type based on the correspondence, to generate the association rule. In comparison with a related technology, in this disclosure, the historical alarm logs do not need to be traversed for a plurality of times, and association rule mining efficiency is improved. In addition, in this disclosure, a quantity of association rules mined based on the temporal correlation between the alarm types is far less than a quantity of association rules mined based on a frequent itemset in the related technology. Therefore, time costs are reduced in a process of determining accuracy of an association rule and a process of determining a root cause alarm type in the association rule. In addition, the alarm event is reconstructed based on an occurrence time interval of the alarm log, and finally, the target alarm event used to indicate the alarm log whose alarm type is the root cause alarm type is displayed to the network monitoring engineer. This greatly reduces alarm log information presented to the network monitoring engineer, and ensures information accuracy and fidelity.

BRIEF DESCRIPTION OF DRAWINGS

FIG. 5B is a schematic diagram of an interface of a target alarm event according to an embodiment of this disclosure.

DESCRIPTION OF EMBODIMENTS

To make the objectives, technical solutions, and advantages of this disclosure clearer, the following further describes implementations of this disclosure in detail with reference to the accompanying drawings.

In a related technology, to reduce a quantity of alarm logs presented to a network monitoring engineer, three alarm log compression manners are provided, and respectively include the following: In a first manner, when a quantity of alarm logs generated by a network device in a preset time period exceeds a preset threshold, it is determined that an alarm storm occurs in the time period, and an alarm log processing device directly discards an alarm log generated after the quantity of alarm logs generated by the network device reaches the preset threshold. In a second manner, alarm logs of a same alarm type that are generated in a preset time period are summarized and counted, and information obtained after statistical collection is presented to the network monitoring engineer. For example, alarm logs generated within 12 hours are summarized and counted, statistics about information such as a quantity of occurrence times of alarm logs of a same alarm type and an average occurrence time interval are collected, and information such as a quantity of occurrence times of alarm logs that correspond to each alarm type and that are generated within the 12 hours and an average occurrence interval is presented to the network monitoring engineer. In a third manner, a historical alarm log is mined in advance according to an automatic frequent itemset mining method, to establish an association rule between different alarm types, then an alarm log whose alarm type is a root cause alarm type is presented to the network monitoring engineer based on the predetermined association rule, and an alarm log of a minor alarm type is filtered out, so as to compress the alarm logs.

However, in the first manner, only the quantity of alarm logs is reduced, and the discarded alarm log may include valid alarm information. Consequently, the valid alarm information is lost. In addition, alarm information presented to the network monitoring engineer still includes a large quantity of redundant alarm logs, and alarm log compression reliability is relatively low. In the second manner, there may be a plurality of independent alarm events (each alarm event includes a plurality of alarm logs of a same alarm type whose occurrence time interval is less than a preset time threshold) in the preset time period, and when the alarm logs of the same alarm type that are generated in the preset time period are summarized and counted, information about each alarm event cannot be obtained. Consequently, the information presented to the network monitoring engineer is distorted. In the third manner, time costs are relatively large in a process of determining accuracy of an association rule and a process of determining a root cause alarm type in the association rule.

Figure 1:
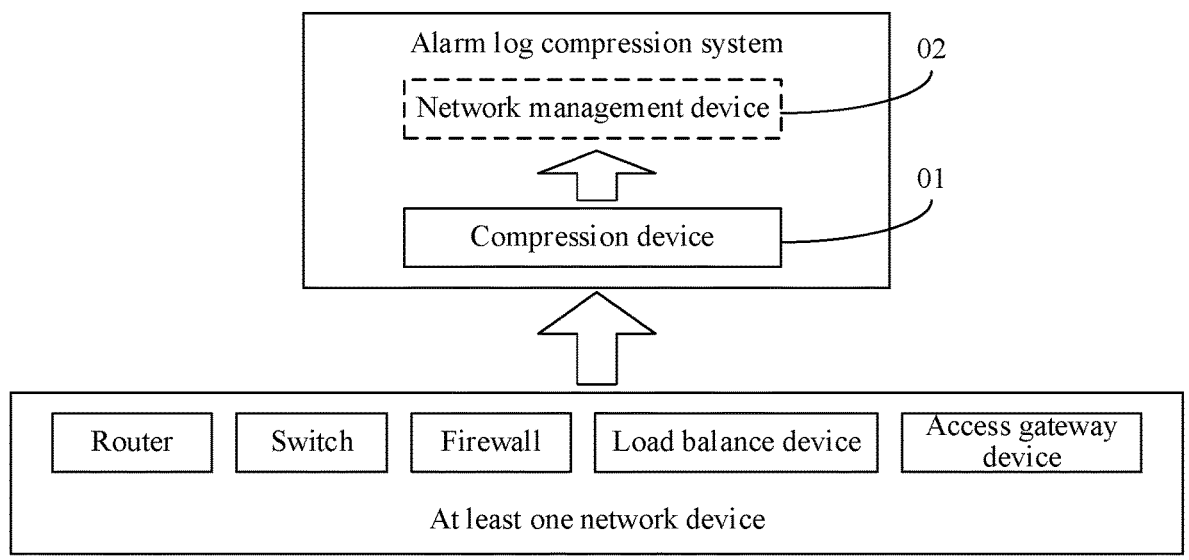
FIG. 1 is a schematic structural diagram of an alarm log compression system according to an embodiment of this disclosure.

An embodiment of this disclosure provides an alarm log compression system, to resolve a problem in a related technology. As shown in FIG. 1, the alarm log compression system includes a compression device 01. The compression device 01 is configured to compress a plurality of alarm logs generated by at least one network device in a communications network.

The compression device 01 may be one server, a server cluster including several servers, or a cloud computing service center. The at least one network device may include a router, a switch, a firewall, a load balance device, an access gateway device, and the like. This is not limited in this disclosure. The compression device 01 establishes a connection to the at least one network device by using a wireless network or a wired network, and all alarm logs generated by the at least one network device in a working process are sent to the compression device 01.

Optionally, as shown in FIG. 1, the alarm log compression system may further include a network management device 02. The network management device 02 establishes a connection to the compression device 01 by using a wireless network or a wired network. The compression device 01 is further configured to output, to the network management device 02, alarm information obtained by compressing the plurality of alarm logs generated by the at least one network device. The network management device 02 is configured to display the alarm information, so that a network monitoring engineer views the alarm information. Further, the network management device 02 may be further configured to: generate a corresponding alarm clearance worksheet after the network monitoring engineer determines valid alarm information, where the alarm clearance worksheet includes a correspondence between alarm information and a network maintenance engineer, and feed back the alarm information to a corresponding network maintenance engineer, so that the network maintenance engineer maintains a corresponding network device. The network management device 02 may be one server, a server cluster including several servers, or a cloud computing service center.

In an actual application, the compression device 01 and the network management device 02 may be devices independent of each other, or the network management device 02 may be integrated into the compression device 01. In this case, the compression device 01 may be further configured to display the alarm information obtained after compressing the plurality of alarm logs generated by the at least one network device.

Figure 2:
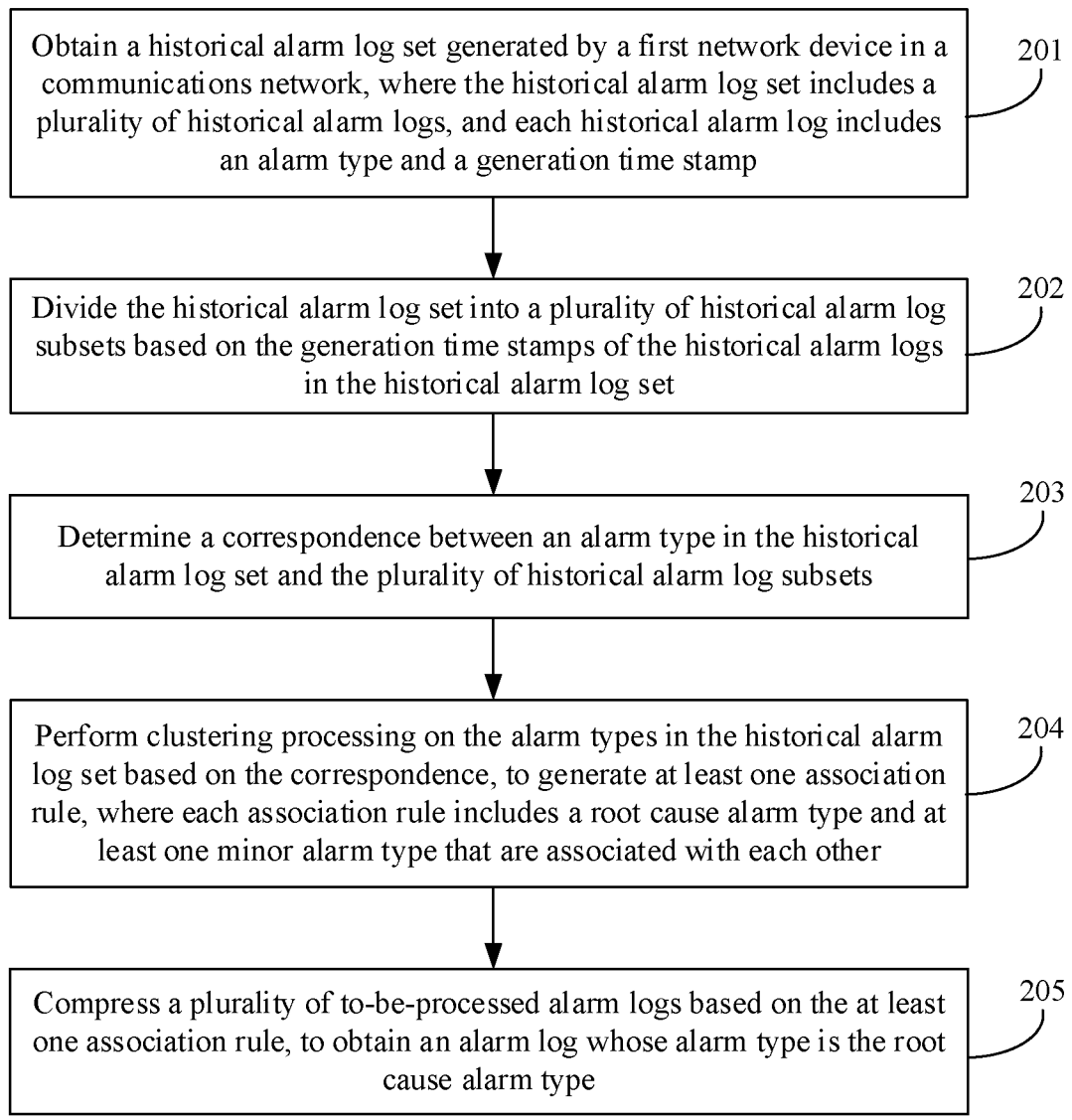
FIG. 2 is a flowchart of an alarm log compression method according to an embodiment of this disclosure.
Figure 4:
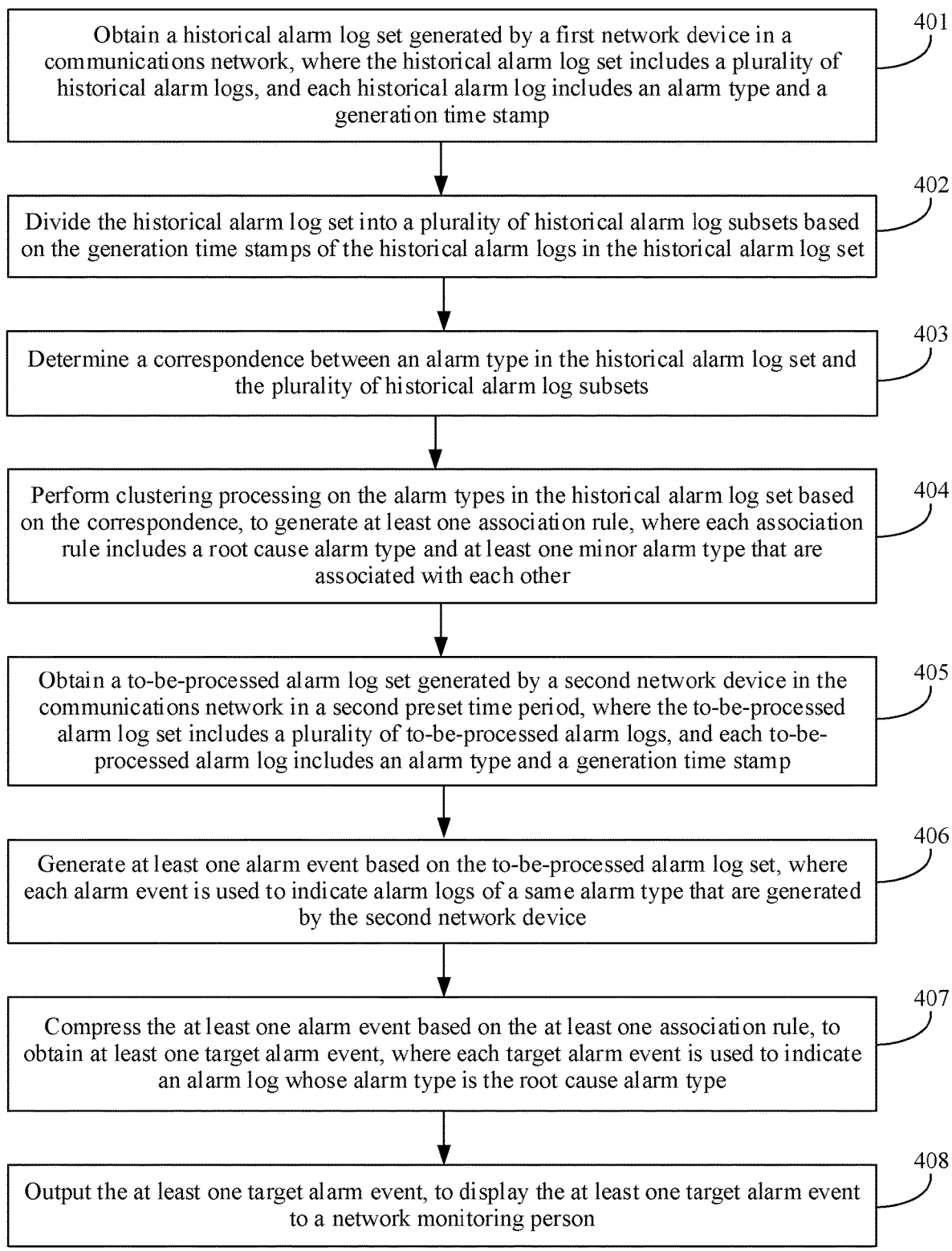
FIG. 4 is a flowchart of another alarm log compression method according to an embodiment of this disclosure.
Figure 6:
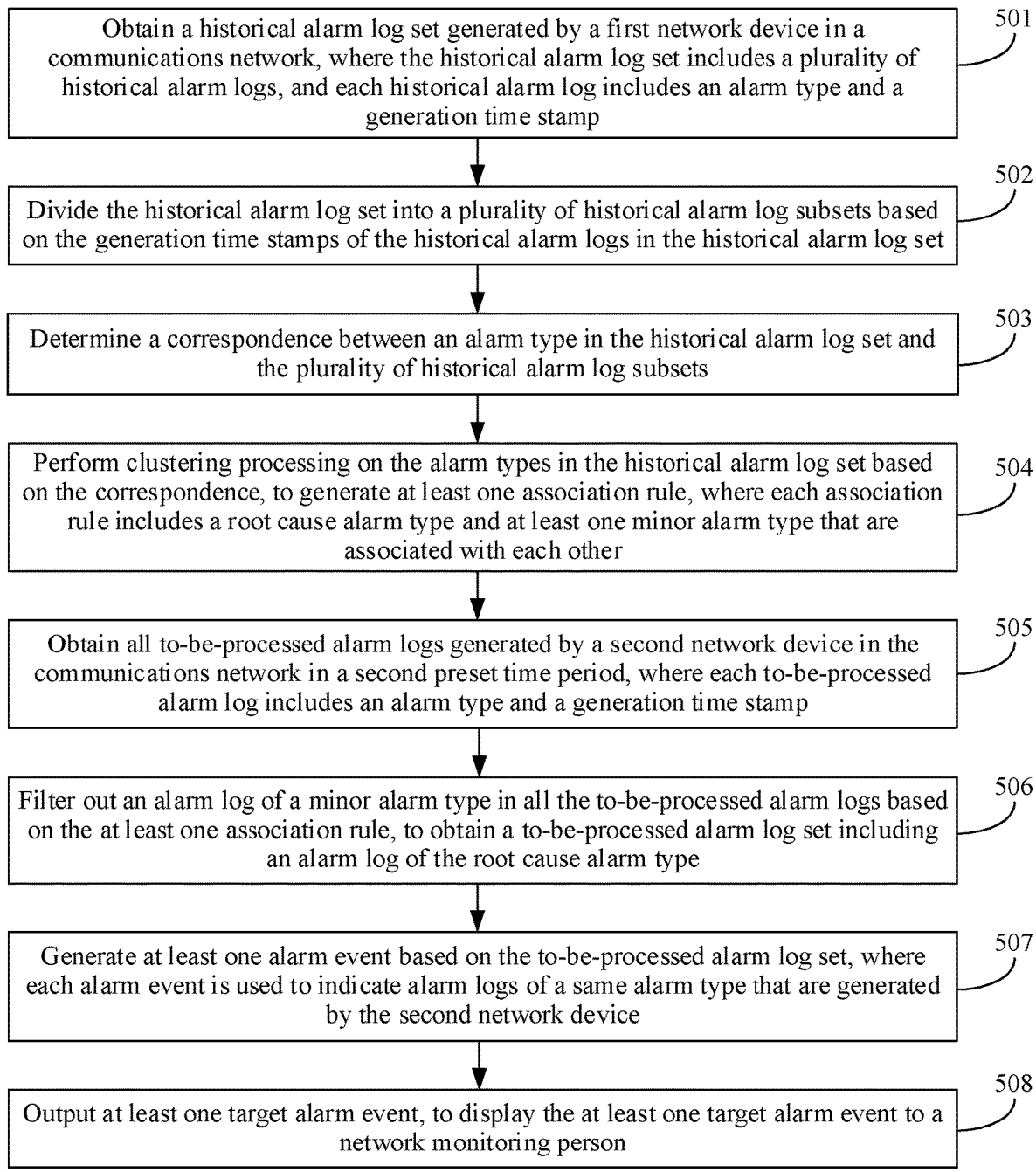
FIG. 6 is a flowchart of still another alarm log compression method according to an embodiment of this disclosure.

According to alarm log compression methods provided in the embodiments of this disclosure, an alarm log of a root cause alarm type may be displayed to a network monitoring engineer, and an alarm event may be further reconstructed, to display an alarm event of the root cause alarm type to the network monitoring engineer. FIG. 2, FIG. 4, and FIG. 6 are used as examples for description in the embodiments of this disclosure. In an alarm log compression method shown in FIG. 2, after an association rule between alarm types is determined in an association rule mining method, an alarm log is compressed based on the association rule, and finally an alarm log of a root cause alarm type is displayed to a network monitoring engineer. In an alarm log compression method shown in FIG. 4, an association rule between alarm types is determined in an association rule mining method, after an alarm event is reconstructed in an alarm event reconstruction method, the alarm event is compressed based on the association rule, and finally an alarm event of a root cause alarm type is displayed to a network monitoring engineer. In an alarm log compression method shown in FIG. 6, after an association rule between alarm types is determined in an association rule mining method, an alarm log of a minor alarm type in a to-be-processed alarm log is first filtered out based on the association rule, then an alarm event is reconstructed by using an alarm log of a root cause alarm type in an alarm event reconstruction method, and finally, the alarm event of the root cause alarm type is displayed to a network monitoring engineer. In comparison with the alarm log compression method shown in FIG. 2, in the alarm log compression methods shown in FIG. 4 and FIG. 6, alarm logs are counted at a granularity of an alarm event, to further reduce alarm log-related information displayed to the network monitoring engineer. In an actual application, after the alarm event is reconstructed in the alarm event reconstruction method provided in this disclosure, all alarm events are directly displayed to the network monitoring engineer. Details are not described in this disclosure. The following further describes the alarm log compression methods by using FIG. 2, FIG. 4, and FIG. 6 as examples.

FIG. 2 is a flowchart of an alarm log compression method according to an embodiment of this disclosure. The method is applied to a compression device. The compression device may be a compression device 01 shown in FIG. 1. As shown in FIG. 2, the method may include the following blocks.

Block 201: Obtain a historical alarm log set generated by a first network device in a communications network, where the historical alarm log set includes a plurality of historical alarm logs, and each historical alarm log includes an alarm type and a generation time stamp.

The communications network includes at least one network device, and the first network device may be any network device in the communications network. In an actual application, the compression device may obtain a plurality of historical alarm log sets generated by a plurality of network devices in the communications network, and separately perform the following blocks 202 to 204 for each historical alarm log set. Each network device corresponds to one historical alarm log set. This is not limited in this embodiment of this disclosure.

Optionally, a method for obtaining a historical alarm log set generated by each network device in the communications network may include:

preprocessing a historical alarm log generated by the first network device in a first preset time period, to remove redundant information from each historical alarm log, to obtain the historical alarm log set corresponding to each network device.

It should be noted that an original alarm log generated by a network device usually carries an alarm type, a generation time stamp, an identifier (ID) of an alarm network device, and some redundant information. A historical alarm log generated by the network device is preprocessed, so that each historical alarm log includes only an alarm type, a generation time stamp, and an ID of an alarm network device, so as to facilitate subsequent processing on the historical alarm log. Therefore, operation costs are reduced, and operation efficiency is improved.

Optionally, each historical alarm log may be represented in a 2-tuple (M, t) format, M represents alarm log information, t represents a generation time stamp, and the alarm log information includes at least an alarm type field and an ID field of the first network device. For example, it is assumed that a historical alarm log generated by the first network device may be represented as (dgd437slhw3m: TCP authentication fails, 14:22:08) after being preprocessed, where dgd437slhw3m is the ID field of the first network device, that TCP authentication fails is an alarm type, and 14:22:08 is a generation time stamp. This alarm log indicates that a case in which "TCP authentication fails" occurs, at 14:22:08, on a network device whose ID is dgd437slhw3m.

In this embodiment of this disclosure, the first preset time period is a past time period (namely, a historical time period). For example, preprocessing the historical alarm log generated by the first network device in the first preset time period may be preprocessing a historical alarm log set generated by the first network device in a past month.

Block 202: Divide the historical alarm log set into a plurality of historical alarm log subsets based on the generation time stamps of the historical alarm logs in the historical alarm log set.

All historical alarm logs in each historical alarm log subset are consecutive in a time sequence. To be specific, each historical alarm log subset includes a plurality of historical alarm logs generated within a preset time period. In addition, a union set of the plurality of historical alarm log subsets includes all the historical alarm logs in the historical alarm log set.

Optionally, the historical alarm logs in the historical alarm log set may have a time partial order relation. To be specific, the historical alarm log set may be a historical alarm sequence including a series of historical alarm logs that have a time partial order relation. A time range of the historical alarm sequence may be $[T_s, T_e]$, where $T_s$ represents a start time of the historical alarm log sequence, and $T_e$ indicates an end time of the historical alarm log sequence. That the historical alarm logs in the historical alarm log set have a time partial order relation means that a generation time of a historical alarm log that is in the historical alarm log set and that is located after any historical alarm log is after a generation time of the any historical alarm log, or is the same as the generation time of the any historical alarm log.

Correspondingly, a method for dividing the historical alarm log set into a plurality of historical alarm log subsets based on the generation time stamps of the historical alarm logs in the historical alarm log set may include:

obtaining a generation time stamp set of the historical alarm logs in the historical alarm log set; and classifying the historical alarm logs into the plurality of historical alarm log subsets based on the generation time stamp set, a preset time window length, and a window sliding step by using a sliding window technique, where the window sliding step is not greater than the time window length.

Optionally, the generation time stamp set of the historical alarm logs in the historical alarm log set is $\{t_k;$ k is a positive integer$\}$, the time window length is win, and the window sliding step is step. In this case, the historical alarm logs are classified from a start time $t_1$ of the historical alarm log set, so that a time window of a first historical alarm log subset is [$t_1$, win), a time window of a second historical alarm log subset is [$t_1$+step, win+step), and by analogy, until an end time of a time window of a last historical alarm log subset is greater than or equal to an end time $t_n$ of the historical alarm log set.

Figure 3:
FIG. 3 is a schematic diagram of dividing a historical alarm log set into a plurality of historical alarm log subsets according to an embodiment of this disclosure.

For example, FIG. 3 is a schematic diagram of dividing a historical alarm log set into a plurality of historical alarm log subsets according to an embodiment of this disclosure. As shown in FIG. 3, a time window length win=3, a window sliding step=2, the generation time stamp set of the historical alarm logs in the historical alarm log set is $\{t_k;$ k is a positive integer$\}$, and alarm types are A, B, C, and D. Time windows of the plurality of historical alarm log subsets obtained by dividing the historical alarm log set are sequentially $w_1=\{t_1, t_2, t_3\}$, $w_2=\{t_3, t_4, t_5\}$, . . . , and $w_m=\{t_n\}$. An alarm type set corresponding to the time window $w_1$ is $\{A, B, C\}$, an alarm type set corresponding to the time window $w_2$ is $\{C, A, D\}$, and an alarm type set corresponding to the time window $w_m$ is $\{D, C, A\}$.

In an actual application, after the generation time stamp set of the historical alarm logs in the historical alarm log set is obtained, the historical alarm log set may be directly divided based on the generation time stamp set. For example, assuming that the generation time stamp set includes 12 generation time stamps, the historical alarm log set may be divided into four historical alarm log subsets, each historical alarm log subset includes historical alarm logs corresponding to three generation time stamps, and the three generation time stamps corresponding to each historical alarm log subset are consecutive in the time sequence.

Block 203: Determine a correspondence between an alarm type in the historical alarm log set and the plurality of historical alarm log subsets.

Optionally, a method for determining the correspondence between an alarm type in the historical alarm log set and the plurality of historical alarm log subsets includes:

obtaining all alarm types in the historical alarm log set, to obtain a first alarm type set; and determining a time sequence vector of each alarm type in the first alarm type set, where each time sequence vector is used to reflect a correspondence between a corresponding alarm type and the plurality of historical alarm log subsets, where for the time sequence vector corresponding to each alarm type, values in the time sequence vector are in a one-to-one correspondence with the plurality of historical alarm log subsets, the values in the time sequence vector include at least one of a first value and a second value, the first value is used to indicate that the corresponding alarm type exists in a corresponding historical alarm log subset, the second value is used to indicate that the corresponding alarm type does not exist in a corresponding historical alarm log subset, and the first value is different from the second value.

Optionally, a process of determining a time sequence vector of each alarm type in the first alarm type set may include: executing a time sequence vector determining procedure for each alarm type in the first alarm type set.

The time sequence vector determining procedure includes: sequentially detecting whether an alarm type exists in the plurality of historical alarm log subsets; and determining a time sequence vector of the alarm type based on a detection result.

For example, with reference to the example in block 202, all the alarm types in the historical alarm log set are obtained, and an obtained first alarm type set is I=$\{A, B, C, D\}$. It is assumed that the first value is 1, and the second value is 0. For the plurality of historical alarm log subsets obtained through division shown in FIG. 3, a time sequence vector of the alarm type A may be represented as $v_A=(1, 1, \ldots, 1)$, a time sequence vector of the alarm type B may be represented as $v_B=(1, 0, \ldots, 0)$, a time sequence vector of the alarm type C may be represented as $v_C=(1, 1, \ldots, 1)$, and a time sequence vector of the alarm type D may be represented as $v_D=(0, 1, \ldots, 1)$.

Block 204: Perform clustering processing on the alarm types in the historical alarm log set based on the correspondence, to generate at least one association rule, where each association rule includes a root cause alarm type and at least one minor alarm type that are associated with each other.

In a same association rule, a fault that occurs on a network device and that is indicated by the minor alarm type is caused by a fault that occurs on the network device and that is indicated by the root cause alarm type. Optionally, after the time sequence vector of each alarm type in the first alarm type set is determined, clustering processing may be performed on all the alarm types based on the time sequence vectors of all the alarm types in the first alarm type set, to generate the at least one association rule.

Optionally, clustering processing may be performed on all the alarm types by using a temporal correlation clustering (TCC) algorithm, to generate the at least one association rule. In this embodiment of this disclosure, the following two methods for performing clustering processing on all the alarm types by using the TCC algorithm to generate an association rule are used as examples for description. The methods include:

A first method for generating an association rule includes:

performing a clustering operation on the first alarm type set, where the clustering operation includes:

S21a. Set a target alarm type set and a second alarm type set, where both the target alarm type set and the second alarm type set are empty sets.

S22a. Add any alarm type in the first alarm type set to the target alarm type set, and delete, from the first alarm type set, the alarm type added to the target alarm type set.

S23a. Perform a determining procedure repeatedly until the first alarm type set becomes an empty set, and determine the target alarm type set as an association rule.

The determining procedure includes:

S231a. Calculate a correlation between a to-be-processed alarm type and the target alarm type set based on a time sequence vector of the to-be-processed alarm type and time sequence vectors of all alarm types in the target alarm type set, where the to-be-processed alarm type is any alarm type in the first alarm type set other than the alarm types in the target alarm type set.

S232a. When the correlation is greater than a preset correlation threshold, add the to-be-processed alarm type to the target alarm type set, to obtain an updated target alarm type set, and delete the to-be-processed alarm type from the first alarm type set.

S233a. When the correlation is not greater than a preset correlation threshold, add the to-be-processed alarm type to the second alarm type set, and delete the to-be-processed alarm type from the first alarm type set.

S24a. After the performing a determining procedure repeatedly, when the second alarm type set is not an empty set, perform the clustering operation repeatedly by using the second alarm type set as a new first alarm type set.

S25a. After the performing a determining procedure repeatedly, when the second alarm type set is an empty set, stop performing the clustering operation.

For example, an algorithm process of performing the clustering operation on the first alarm type set in the foregoing method is as follows:

```
TCC(I) //I is the first alarm type set
{
    Randomly select one alarm type i_i ∈ I from I
    Set a target alarm type set R = {i_i} and a second alarm type set I' = Ø
    For all alarm types i_j ∈ I,i_j ≠ i_i
    {
        If AveCor(i_j,R) > Threshold  //Threshold is a preset correlation threshold
    Add i_j to R
    Else
        Add i_j to I'
    }
    R' = TCC(I')  //Perform recursively invocation, to perform a clustering operation on a
remaining second alarm type set I'
    Return R∪R'  //Return all association rules obtained through clustering performed on
the first alarm type set
}
```

A second method for generating an association rule includes:

marking a target alarm type in the first alarm type set, where the target alarm type is any alarm type in the first alarm type set; and performing a clustering operation on the first alarm type set, where the clustering operation includes:

S21b. Execute a determining procedure repeatedly until all the alarm types in the first alarm type set are traversed.

The determining procedure includes:

S211b. Determine, as a target alarm type set, a set including all alarm types in the first alarm type set that have the same mark as the target alarm type.

S212b. Calculate a correlation between a to-be-processed alarm type and the target alarm type set based on a time sequence vector of the to-be-processed alarm type and time sequence vectors of all the alarm types in the target alarm type set, where the to-be-processed alarm type is any alarm type in the first alarm type set other than the alarm types in the target alarm type set.

S213b. Mark the to-be-processed alarm type when the correlation is greater than a preset correlation threshold, where a mark of the to-be-processed alarm type is the same as a mark of the target alarm type.

S22b. After the executing a determining procedure repeatedly, when there is an alarm type for which no mark is set in the first alarm type set, determine, as a new target alarm type, any alarm type for which no mark is set, mark the new target alarm type, and perform the clustering operation repeatedly, where different target alarm types have different marks.

S23b. After the executing a determining procedure repeatedly, when there is no alarm type for which no mark is set in the first alarm type set, stop performing the clustering operation, and generate the at least one association rule based on the first alarm type set, where a same mark is set for all alarm types in each association rule.

Optionally, in S231a and S212b, the calculating a correlation between a to-be-processed alarm type and the target alarm type set based on a time sequence vector of the to-be-processed alarm type and time sequence vectors of all alarm types in the target alarm type set includes:

1. Calculate a correlation between the to-be-processed alarm type and each alarm type in the target alarm type set according to a Pearson correlation coefficient formula, where the Pearson correlation coefficient formula is:

$$Cor(i_i, i_j) = \frac{cov(v_i, v_j)}{\sigma_{v_i}, \sigma_{v_j}},$$

where $Cor(i_i, i_j)$ represents a correlation between an alarm type $i_i$ and an alarm type $i_j$, $cov(v_i, v_j)$ represents a covariance between $v_i$ and $v_j$, $\sigma v_i$ represents a standard deviation of $v_i$, $\sigma_{v_j}$ represents a standard deviation of $v_j$, $v_i$ represents a time sequence vector of the alarm type $i_i$, and $v_j$ represents a time sequence vector of the alarm type $i_j$.

2. Calculate the correlation between the to-be-processed alarm type and the target alarm type set based on the correlation between the to-be-processed alarm type and each alarm type in the target alarm type set according to an average correlation calculation formula, where the average correlation calculation formula is:

$$AveCor(i_j, R) = \frac{\sum_{i_i \in R} Cor(i_i, i_j)}{|R|},$$

where $AveCor(i_j, R)$ indicates a correlation between the alarm type $i_j$ and a target alarm type set R, and $|R|$ indicates a quantity of alarm types in the target alarm type set R.

For example, in S23a, when the first alarm type set is an empty set, in other words, after all the alarm types in the first alarm type set are traversed, and assuming that the target alarm type set is $R_k=\{i_1, i_2, \ldots, i_k\}$, a corresponding association rule includes a k-item set (namely, $R_k$), indicating that there is a strong correlation between alarm logs of k alarm types in $R_k$. Each item $i_k$ represents one alarm type.

It should be noted that a union set of all the association rules obtained through clustering performed on the first alarm type set includes all the alarm types in the first alarm type set. For example, all the association rules obtained through clustering performed on the first alarm type set include $\{R_1, \ldots, R_k\}$. In this case, $R_1 \cup \ldots \cup R_k = I$.

Block 205: Compress a plurality of to-be-processed alarm logs based on the at least one association rule, to obtain an alarm log whose alarm type is the root cause alarm type.

Optionally, the plurality of to-be-processed alarm logs may be alarm logs generated by a second network device. The second network device and the first network device may be a same network device, or the second network device and the first network device may be different network devices of a same type. This is not limited. That types are the same includes that models are the same and/or the types are the same. For example, both the first network device and the second network device may be firewalls, or both the first network device and the second network device may be firewalls of a model A0.

Optionally, after the at least one association rule is generated, an expert may analyze and determine the root cause alarm type and the minor alarm type in the association rule, or may calculate a correlation between any alarm type in the association rule and another alarm type in the association rule, determine an alarm type with a highest correlation with another alarm type as the root cause alarm type, and determine an alarm type other than the root cause alarm type in the association rule as the minor alarm type. A manner of determining the root cause alarm type and the minor alarm type in the association rule is not limited in this embodiment of this disclosure.

For example, it is assumed that an association rule is {LinkDown_Active,MSTP_PORT_STATE_FORWARDING, MSTP_PORT_STATE_LEARNING,MSTP_PROPORT_ROLE_CHANGE,MSTP_PORT_STATE_DISCARDING}. After the expert analyzes the association rule, it is found that a port fault (an alarm type is LinkDown_Active) causes a frequent intermittent disconnection of a multiple spanning tree protocol (MSTP) module. Therefore, it can be determined that LinkDown_Active is the root cause alarm type, and another alarm type in the association rule is a correlative alarm type (minor alarm type) that occur at a same time as the root cause alarm type. Based on the association rule, only an alarm log whose alarm type is LinkDown_Active, and an alarm log whose alarm type is the minor alarm type is filtered out, to compress the to-be-processed alarm logs.

In an actual application, because network devices of a same type may compress, by using a same association rule, alarm logs generated by the network devices, in an association rule mining process, an association rule does not need to be mined for a historical alarm log generated by each network device, several network devices are selected from a plurality of network devices of a same type, and an association rule is mined for the historical alarm log generated by the network devices. Therefore, time costs of mining an association rule can be reduced.

In conclusion, according to the alarm log compression method provided in this embodiment of this disclosure, the association rule is mined based on a temporal correlation between alarm types. In a mining process, only alarm types in the plurality of historical alarm log subsets obtained through division performed based on the generation time stamp should be traversed, and then a correspondence between each alarm type and the plurality of historical alarm log subsets is determined, for example, after the time sequence vector of each alarm type is determined, clustering processing may be performed on the alarm type based on the correspondence, to generate the association rule. In comparison with a related technology, in this disclosure, the historical alarm logs do not need to be traversed for a plurality of times, and association rule mining efficiency is improved. In addition, in this disclosure, a quantity of association rules mined based on the temporal correlation between the alarm types is far less than a quantity of association rules mined based on a frequent itemset in the related technology. Therefore, time costs are reduced in a process of determining accuracy of an association rule and a process of determining a root cause alarm type in the association rule.

FIG. 4 is a flowchart of another alarm log compression method according to an embodiment of this disclosure. The method is applied to a compression device. The compression device may be a compression device 01 shown in FIG. 1. As shown in FIG. 4, the method may include the following blocks.

Block 401: Obtain a historical alarm log set generated by a first network device in a communications network, where the historical alarm log set includes a plurality of historical alarm logs, and each historical alarm log includes an alarm type and a generation time stamp.

For an implementation process of this block, refer to block 201. Details are not described herein again.

Block 402: Divide the historical alarm log set into a plurality of historical alarm log subsets based on the generation time stamps of the historical alarm logs in the historical alarm log set.

For an implementation process of this block, refer to block 202. Details are not described herein again.

Block 403: Determine a correspondence between an alarm type in the historical alarm log set and the plurality of historical alarm log subsets.

For an implementation process of this block, refer to block 203. Details are not described herein again.

Block 404: Perform clustering processing on the alarm types in the historical alarm log set based on the correspondence, to generate at least one association rule, where each association rule includes a root cause alarm type and at least one minor alarm type that are associated with each other.

For an implementation process of this block, refer to block 204. Details are not described herein again.

Block 405: Obtain a to-be-processed alarm log set generated by a second network device in the communications network in a second preset time period, where the to-be-processed alarm log set includes a plurality of to-be-processed alarm logs, and each to-be-processed alarm log includes an alarm type and a generation time stamp.

Optionally, the second network device and the first network device may be a same network device; or the second network device and the first network device may be different network devices of a same type.

An original alarm log generated by a network device usually carries an alarm type, a generation time stamp, an identifier (ID) of an alarm network device, and some redundant information. In this embodiment of this disclosure, the obtained to-be-processed alarm log may be preprocessed to remove redundant information from the original alarm log, to obtain the to-be-processed alarm log set, so as to facilitate subsequent processing on the to-be-processed alarm log. Therefore, operation costs are reduced, and operation efficiency is improved.

For example, it is assumed that the to-be-processed alarm logs generated by the second network device in the second preset time period may include: {(TCP authentication fails, 14:22:08), (TCP authentication fails, 14:22:38), (TCP authentication fails, 14:23:25), (TCP authentication fails, 21:18:20), (TCP authentication fails, 21:19:18), (TCP authentication fails, 21:19:55)}. These to-be-processed alarm logs indicate alarm logs whose alarm types are that TCP authentication fails.

In this embodiment of this disclosure, the second preset time period is a past time period. For example, preprocessing a to-be-processed alarm log generated by each network device in the second preset time period may be preprocessing, every 12 hours, a to-be-processed alarm log generated by each network device within the 12 hours.

Block 406: Generate at least one alarm event based on the to-be-processed alarm log set, where each alarm event is used to indicate alarm logs of a same alarm type that are generated by the second network device.

Optionally, a method for generating the at least one alarm event based on the to-be-processed alarm log set may include:

for each alarm type in the to-be-processed alarm log set, obtaining a target alarm log that is in the to-be-processed alarm log set and that is of the alarm type; separately calculating an occurrence time interval between every two target alarm logs in the to-be-processed alarm log set that are adjacent in the time sequence; and reconstructing, into one alarm event based on the occurrence time interval between every two target alarm logs, target alarm logs in the to-be-processed alarm log set that belong to a same alarm event.

Optionally, the alarm event may include the alarm type, and at least one of a start occurrence moment, an end occurrence moment, an average occurrence time interval, and a quantity of occurrence times of the alarm log in the alarm event. In an actual application, the alarm event may further include generation time stamps (including start occurrence moments and end occurrence moments) of all alarm logs. This is not limited.

For example, in block 405, the plurality of to-be-processed alarm logs generated by the second network device in the second preset time period include two independent events in which TCP authentication fails and that respectively occur in two time periods: {14:22:08-14:23:25} and {21:18:20-21:19:55}. The plurality of to-be-processed alarm logs may be reconstructed into two alarm events: {TCP authentication fails, 14:22:08, 14:22:38, 14:23:25} and {TCP authentication fails, 21:18:20, 21:19:18, 21:19:55}. Each alarm event includes an alarm type and a generation time stamp of each alarm log.

Optionally, generation time stamps of to-be-processed alarm logs that are generated by the second network device within the second preset time and that have a time partial order relation are respectively $t_0$, $t_1$, ..., and $t_n$, and occurrence time intervals between the to-be-processed alarm logs are respectively $s_1$, $s_2$, ..., $s_i$, ..., and $s_n$, where $s_k = t_k - t_{k-1}$, and k is a positive integer.

Figure 5A:
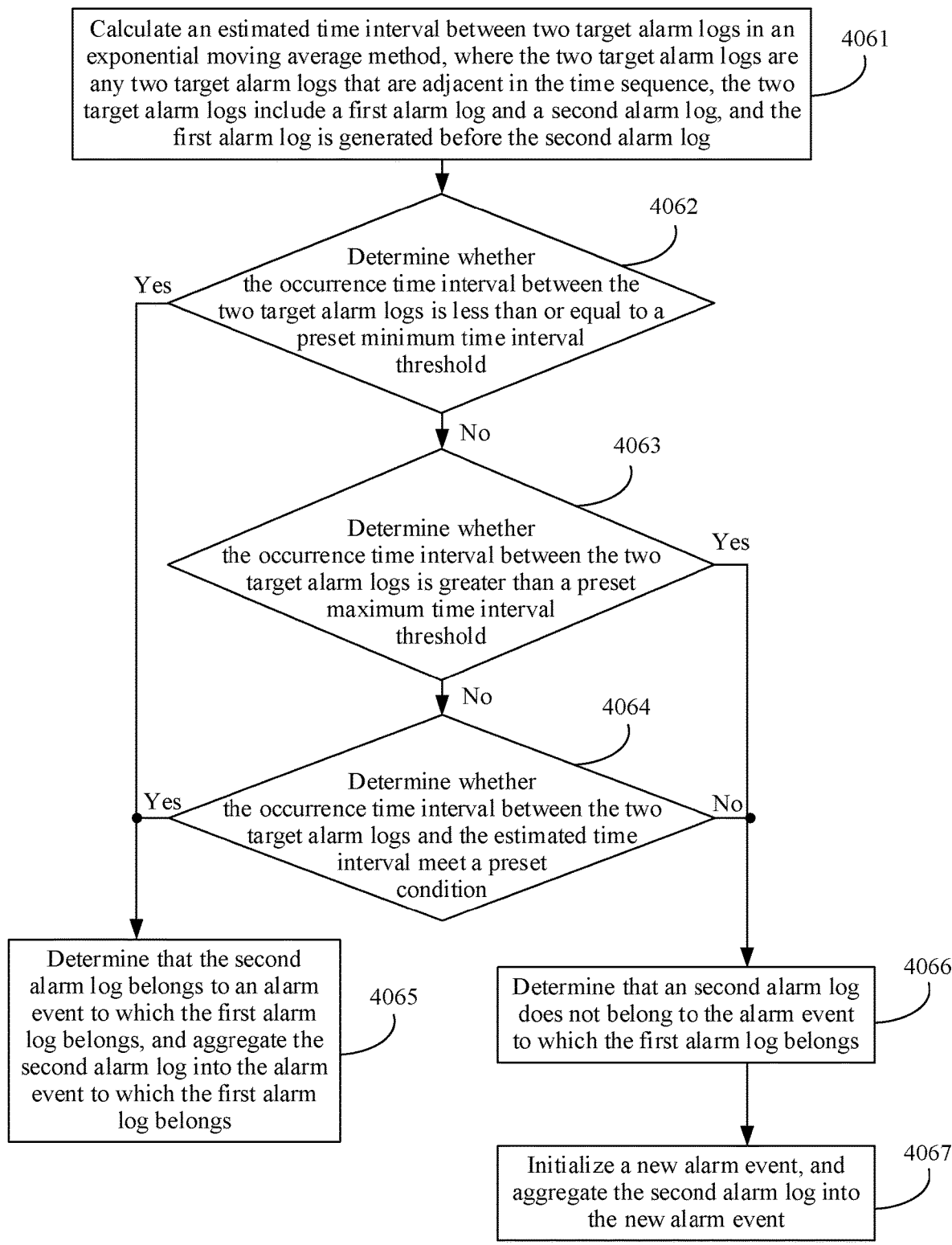
FIG. 5A is a flowchart of an alarm event reconstruction method according to an embodiment of this disclosure.

Optionally, as shown in FIG. 5A, a method for reconstructing, into one alarm event based on the occurrence time interval between every two target alarm logs, the target alarm logs in the to-be-processed alarm log set that belong to the same alarm event may include:

Block 4061: Calculate an estimated time interval between the two target alarm logs by using an exponential moving average method, where the two target alarm logs are any two target alarm logs that are adjacent in the time sequence, the two target alarm logs include a first alarm log and a second alarm log, and the first alarm log is generated before the second alarm log.

The occurrence time interval $s_k$ between the two target alarm logs is $s_k = t_k - t_{k-1}$, the estimated time interval $s_k'$ between the two target alarm logs that is calculated in the exponential moving average (EWMA) method is $s_k' = \alpha * s_{k-1} + (1-\alpha) * s'_{k-1}$, $t_k$ is a generation time stamp of the second alarm log, $t_{k-1}$ is a generation time stamp of the first alarm log, $s_{k-1} = t_{k-1} - t_{k-2}$, and $0 \leq \alpha \leq 1$. In this case, k is an integer greater than 1.

Optionally, the parameter a may be configured based on an actual requirement, and a specific value of $\alpha$ is not limited.

Block 4062: Determine whether the occurrence time interval between the two target alarm logs is less than or equal to a preset minimum time interval threshold; and when the occurrence time interval between the two target alarm logs is less than or equal to the preset minimum time interval threshold, perform block 4065; or when the occurrence time interval between the two target alarm logs is greater than the preset minimum time interval threshold, perform block 4063.

Block 4063: Determine whether the occurrence time interval between the two target alarm logs is greater than a preset maximum time interval threshold; and when the occurrence time interval between the two target alarm logs is greater than the preset maximum time interval threshold, perform block 4066; or when the occurrence time interval between the two target alarm logs is not greater than the preset maximum time interval threshold, perform block 4064.

Block 4064: Determine whether the occurrence time interval between the two target alarm logs and the estimated time interval meet a preset condition; and when the occurrence time interval between the two target alarm logs and the estimated time interval meet the preset condition, perform block 4065; or when the occurrence time interval between the two target alarm logs and the estimated time interval do not meet the preset condition, perform block 4066.

Referring to block 4061, the preset condition may be $s_k \leq *s_k'$, where $\beta$ is a positive number, $s_{max} \leq \beta * s_k' \leq s_{max}$, $s_{min}$ is the minimum time interval threshold, and $s_{max}$ is the maximum time interval threshold.

Block 4065: Determine that the second alarm log belongs to an alarm event to which the first alarm log belongs, and aggregate the second alarm log into the alarm event to which the first alarm log belongs.

Further, after block 4065 is performed, return to block 4061 to continue to determine whether a next target alarm log belongs to the alarm event to which the first alarm log and the second alarm log belong, so as to poll a target alarm event. For example, k=k+1, and return to block 4061.

For example, it is assumed that the alarm event to which the first alarm log belongs is {(TCP authentication fails, 14:22:08), (TCP authentication fails, 14:22:38)}. When it is determined that the second alarm log (TCP authentication fails, 14:23:25) belongs to the alarm event to which the first alarm log belongs, the second alarm log is aggregated into the alarm event to which the first alarm log belongs, and the alarm event may be updated to {(TCP authentication fails, 14:22:08), (TCP authentication fails, 14:22:38), (TCP authentication fails, 14:23:25)}.

Block 4066: Determine that the second alarm log does not belong to an alarm event to which the first alarm log belongs.

For example, it is assumed that the alarm event to which the first alarm log belongs is {(TCP authentication fails, 14:22:08), (TCP authentication fails, 14:22:38), (TCP authentication fails, 14:23:25)}. When it is determined that the second alarm log (TCP authentication fails, 21:18:20) does not belong to the alarm event to which the first alarm log belongs, reconstruction of the alarm event to which the first alarm log belongs ends, in other words, reconstruction of the alarm event is completed.

Block 4067: Initialize a new alarm event, and aggregate the second alarm log into the new alarm event.

Further, after block 4067 is performed, return to block 4061 to continue to determine whether a next target alarm event belongs to the alarm event to which the second alarm log belongs, so as to poll a target alarm event. For example, k=k+1, and return to block 4061.

Optionally, blocks 4062 and 4063 may not be performed. This is not limited.

It should be noted that, to reconstruct the alarm event based on the occurrence time interval between alarm logs, statistics about alarm log information may be collected at a granularity of the alarm event, thereby improving accuracy and reliability of the alarm log information obtained through statistics collection.

Block 407: Compress the at least one alarm event based on the at least one association rule, to obtain at least one target alarm event, where each target alarm event is used to indicate an alarm log whose alarm type is the root cause alarm type.

Block 408: Output the at least one target alarm event, to display the at least one target alarm event to a network monitoring engineer.

For example, FIG. 5B is a schematic diagram of an interface of a target alarm event according to an embodiment of this disclosure. As shown in FIG. 5B, after an alarm log generated by each network device is compressed in the alarm log compression method shown in FIG. 4, a target alarm event M obtained by reconstructing an alarm log of the root cause alarm type is displayed, and each target alarm event includes information such as a host name (an ID of the alarm network device), a quantity of occurrence times, and a root-cause log (the root cause alarm type).

It should be noted that a sequence of blocks of the alarm log compression method provided in this embodiment of this disclosure may be properly adjusted. For example, block 405 and block 406 may be performed before block 401, or a block may be correspondingly added or deleted based on a case. Any variation method readily figured out by a person skilled in the art within the technical scope disclosed in this disclosure shall fall within the protection scope of this disclosure. Therefore, details are not described again.

In conclusion, according to the alarm log compression method provided in the embodiments of this disclosure, the association rule is mined based on a temporal correlation between alarm types. In a mining process, only alarm types in the plurality of historical alarm log subsets obtained through division performed based on the generation time stamp should be traversed, and then a correspondence between each alarm type and the plurality of historical alarm log subsets is determined, for example, after the time sequence vector of each alarm type is determined, clustering processing may be performed on the alarm type based on the correspondence, to generate the association rule. In comparison with a related technology, in this disclosure, the historical alarm logs do not need to be traversed for a plurality of times, and association rule mining efficiency is improved. In addition, in this disclosure, a quantity of association rules mined based on the temporal correlation between the alarm types is far less than a quantity of association rules mined based on a frequent itemset in the related technology. Therefore, time costs are reduced in a process of determining accuracy of an association rule and a process of determining a root cause alarm type in the association rule. In addition, the alarm event is reconstructed based on an occurrence time interval of the alarm log, and finally, the target alarm event used to indicate the alarm log whose alarm type is the root cause alarm type is displayed to the network monitoring engineer. This greatly reduces alarm log information presented to the network monitoring engineer, and ensures information accuracy and fidelity.

FIG. 6 is a flowchart of still another alarm log compression method according to an embodiment of this disclosure. The method is applied to a compression device. The compression device may be a compression device 01 shown in FIG. 1. As shown in FIG. 6, the method may include the following blocks.

Block 501: Obtain a historical alarm log set generated by a first network device in a communications network, where the historical alarm log set includes a plurality of historical alarm logs, and each historical alarm log includes an alarm type and a generation time stamp.

For an implementation process of this block, refer to block 201. Details are not described herein again.

Block 502: Divide the historical alarm log set into a plurality of historical alarm log subsets based on the generation time stamps of the historical alarm logs in the historical alarm log set.

For an implementation process of this block, refer to block 202. Details are not described herein again.

Block 503: Determine a correspondence between an alarm type in the historical alarm log set and the plurality of historical alarm log subsets.

For an implementation process of this block, refer to block 203. Details are not described herein again.

Block 504: Perform clustering processing on the alarm types in the historical alarm log set based on the correspondence, to generate at least one association rule, where each association rule includes a root cause alarm type and at least one minor alarm type that are associated with each other.

For an implementation process of this block, refer to block 204. Details are not described herein again.

Block 505: Obtain all to-be-processed alarm logs generated by a second network device in the communications network in a second preset time period, where each to-be-processed alarm log includes an alarm type and a generation time stamp.

Optionally, the second network device and the first network device may be a same network device; or the second network device and the first network device may be different network devices of a same type.

Block 506: Filter out an alarm log of a minor alarm type in all the to-be-processed alarm logs based on the at least one association rule, to obtain a to-be-processed alarm log set including an alarm log of the root cause alarm type.

Block 507: Generate at least one alarm event based on the to-be-processed alarm log set, where each alarm event is used to indicate alarm logs of a same alarm type that are generated by the second network device.

For an implementation process of this block, refer to block 406. Details are not described herein again.

Block 508: Output at least one target alarm event, to display the at least one target alarm event to a network monitoring engineer.

It should be noted that the alarm log of the minor alarm type in all the to-be-processed alarm logs is filtered out, so that a quantity of to-be-processed alarm logs can be greatly reduced. Further, an alarm event is reconstructed based on this basis, so that time costs are reduced in an alarm event reconstruction process, and compression efficiency is further improved.

Figure 7A:
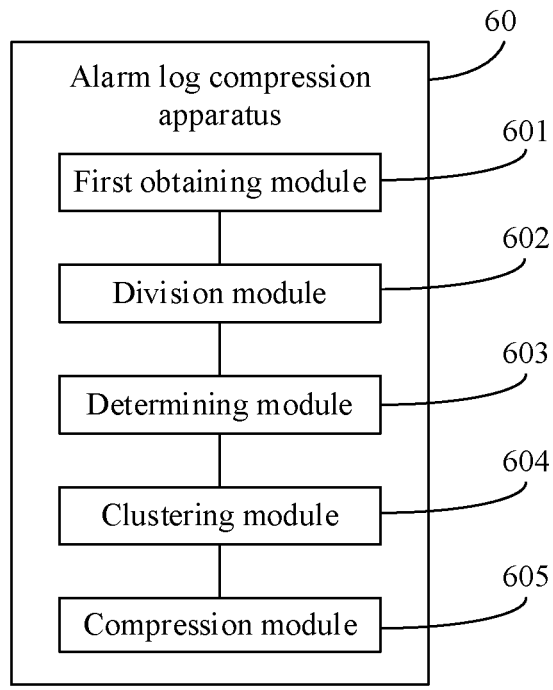
FIG. 7A is a schematic structural diagram of an alarm log compression apparatus according to an embodiment of this disclosure.

FIG. 7A is a schematic structural diagram of an alarm log compression apparatus according to an embodiment of this disclosure. The apparatus is applied to a compression device. As shown in FIG. 7A, the apparatus 60 includes:

a first obtaining module 601, configured to obtain a historical alarm log set generated by a first network device in a communications network, where the historical alarm log set includes a plurality of historical alarm logs, and each historical alarm log includes an alarm type and a generation time stamp;

a division module 602, configured to divide the historical alarm log set into a plurality of historical alarm log subsets based on the generation time stamps of the historical alarm logs in the historical alarm log set, where all historical alarm logs in each historical alarm log subset are consecutive in a time sequence, and a union set of the plurality of historical alarm log subsets includes all the historical alarm logs in the historical alarm log set;

a determining module 603, configured to determine a correspondence between an alarm type in the historical alarm log set and the plurality of historical alarm log subsets;

a clustering module 604, configured to perform clustering processing on the alarm types in the historical alarm log set based on the correspondence, to generate at least one association rule, where each association rule includes a root cause alarm type and at least one minor alarm type that are associated with each other; and a compression module 605, configured to compress a plurality of to-be-processed alarm logs based on the at least one association rule, to obtain an alarm log whose alarm type is the root cause alarm type.

Figure 7B:
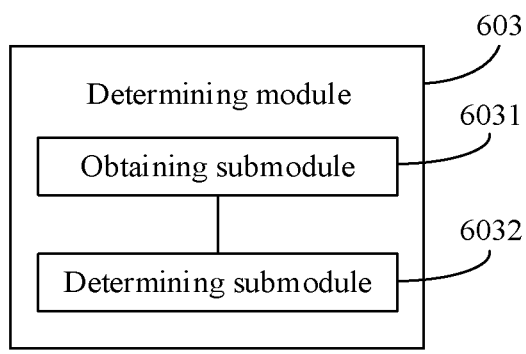
FIG. 7B is a schematic structural diagram of a determining module according to an embodiment of this disclosure.

Optionally, as shown in FIG. 7B, the determining module 603 may include:

an obtaining submodule 6031, configured to obtain all alarm types in the historical alarm log set, to obtain a first alarm type set; and a determining submodule 6032, configured to determine a time sequence vector of each alarm type in the first alarm type set, where each time sequence vector is used to reflect a correspondence between a corresponding alarm type and the plurality of historical alarm log sub sets.

For the time sequence vector corresponding to each alarm type, values in the time sequence vector are in a one-to-one correspondence with the plurality of historical alarm log subsets, the values in the time sequence vector include at least one of a first value and a second value, the first value is used to indicate that the alarm type exists in a corresponding historical alarm log subset, the second value is used to indicate that the alarm type does not exist in a corresponding historical alarm log subset, and the first value is different from the second value.

Optionally, the determining submodule may be further configured to:

execute a time sequence vector determining procedure for each alarm type in the first alarm type set.

The time sequence vector determining procedure includes:

sequentially detecting whether the alarm type exists in the plurality of historical alarm log subsets; and determining the time sequence vector of the alarm type based on a detection result.

Correspondingly, the clustering module may be configured to:

perform clustering processing on all the alarm types in the first alarm type set based on the time sequence vectors of all the alarm types, to generate the at least one association rule.

Further, the clustering module may be further configured to:

perform a clustering operation on the first alarm type set, where the clustering operation includes:

setting a target alarm type set and a second alarm type set, where both the target alarm type set and the second alarm type set are empty sets;

adding any alarm type in the first alarm type set to the target alarm type set, and deleting, from the first alarm type set, the alarm type added to the target alarm type set;

performing a determining procedure repeatedly until the first alarm type set becomes an empty set, and determining the target alarm type set as an association rule; and after the performing a determining procedure repeatedly, when the second alarm type set is not an empty set, performing the clustering operation repeatedly by using the second alarm type set as a new first alarm type set; or after the performing a determining procedure repeatedly, when the second alarm type set is an empty set, stopping performing the clustering operation.

The determining procedure includes:

calculating a correlation between a to-be-processed alarm type and the target alarm type set based on a time sequence vector of the to-be-processed alarm type and time sequence vectors of all alarm types in the target alarm type set, where the to-be-processed alarm type is any alarm type in the first alarm type set other than the alarm types in the target alarm type set; and when the correlation is greater than a preset correlation threshold, adding the to-be-processed alarm type to the target alarm type set, to obtain an updated target alarm type set, and deleting the to-be-processed alarm type from the first alarm type set; or when the correlation is not greater than a preset correlation threshold, adding the to-be-processed alarm type to the second alarm type set, and deleting the to-be-processed alarm type from the first alarm type set.

Alternatively, the clustering module may be further configured to:

mark a target alarm type in the first alarm type set, where the target alarm type is any alarm type in the first alarm type set; and perform a clustering operation on the first alarm type set, where the clustering operation includes:

execute a determining procedure repeatedly until all the alarm types in the first alarm type set are traversed; and after the executing a determining procedure repeatedly, when there is an alarm type for which no mark is set in the first alarm type set, determine, as a new target alarm type, any alarm type for which no mark is set, mark the new target alarm type, and perform the clustering operation repeatedly, where different target alarm types have different marks; or after the executing a determining procedure repeatedly, when there is no alarm type for which no mark is set in the first alarm type set, stop performing the clustering operation, and generate the at least one association rule based on the first alarm type set, where a same mark is set for all alarm types in each association rule.

The determining procedure includes:

determining, as a target alarm type set, a set including all alarm types in the first alarm type set that have the same mark as the target alarm type;

calculating a correlation between a to-be-processed alarm type and the target alarm type set based on a time sequence vector of the to-be-processed alarm type and time sequence vectors of all the alarm types in the target alarm type set, where the to-be-processed alarm type is any alarm type in the first alarm type set other than the alarm types in the target alarm type set; and marking the to-be-processed alarm type when the correlation is greater than a preset correlation threshold, where a mark of the to-be-processed alarm type is the same as a mark of the target alarm type.

Optionally, the clustering module may be further configured to:

calculate a correlation between the to-be-processed alarm type and each alarm type in the target alarm type set according to a Pearson correlation coefficient formula, where the Pearson correlation coefficient formula is:

$$Cor(i_i, i_j) = \frac{\text{cov}(v_i, v_j)}{\sigma_{v_i}, \sigma_{v_j}},$$

where

Cor($i_i$, $i_j$) represents a correlation between an alarm type $i_i$ and an alarm type $i_j$, cov($v_i$, $v_j$) represents a covariance between $v_i$ and $v_j$, $\sigma_{v_i}$ represents a standard deviation of $v_i$, $\sigma_{v_j}$ represents a standard deviation of $v_j$, $v_i$ represents a time sequence vector of the alarm type $i_i$, and $v_j$ represents a time sequence vector of the alarm type $i_j$; and calculate the correlation between the to-be-processed alarm type and the target alarm type set based on the correlation between the to-be-processed alarm type and each alarm type in the target alarm type set according to an average correlation calculation formula, where the average correlation calculation formula is:

$$AveCor(i_j, R) = \frac{\sum_{i_i \in R} Cor(i_i, i_j)}{|R|},$$

where

AveCor($i_j$, R) indicates a correlation between the alarm type $i_j$ and a target alarm type set R, and |R| indicates a quantity of alarm types in the target alarm type set R.

Optionally, the first obtaining module may be configured to:

preprocess a historical alarm log generated by the first network device in a first preset time period, to remove redundant information from each historical alarm log, to obtain the historical alarm log set.

Each historical alarm log is represented in a 2-tuple (M, t) format, M represents alarm log information, t represents a generation time stamp, and the alarm log information includes at least an alarm type field and an identifier field of an alarm network device.

Optionally, the historical alarm logs in the historical alarm log set have a time partial order relation, and the division module may be configured to:

obtain a generation time stamp set of the historical alarm logs in the historical alarm log set; and classify the historical alarm logs into the plurality of historical alarm log subsets based on the generation time stamp set, a preset time window length, and a window sliding step, where the window sliding step is not greater than the time window length.

Figure 7C:
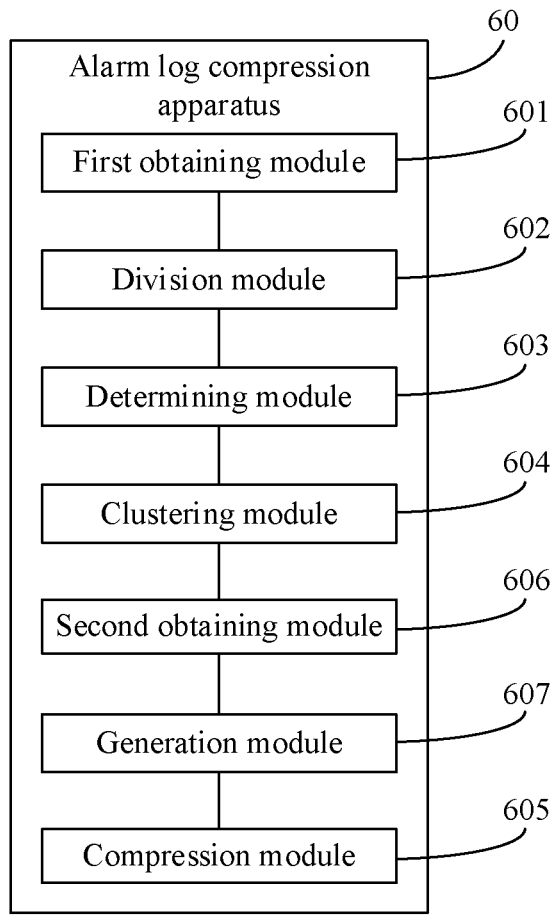
FIG. 7C is a schematic structural diagram of another alarm log compression apparatus according to an embodiment of this disclosure.

Optionally, as shown in FIG. 7C, the apparatus 60 further includes:

a second obtaining module 606, configured to obtain a to-be-processed alarm log set generated by a second network device in the communications network in a second preset time period, where the to-be-processed alarm log set includes the plurality of to-be-processed alarm logs, and each to-be-processed alarm log includes an alarm type and a generation time stamp; and a generation module 607, configured to generate at least one alarm event based on the to-be-processed alarm log set, where each alarm event is used to indicate alarm logs of a same alarm type that are generated by the second network device.

Figure 7D:
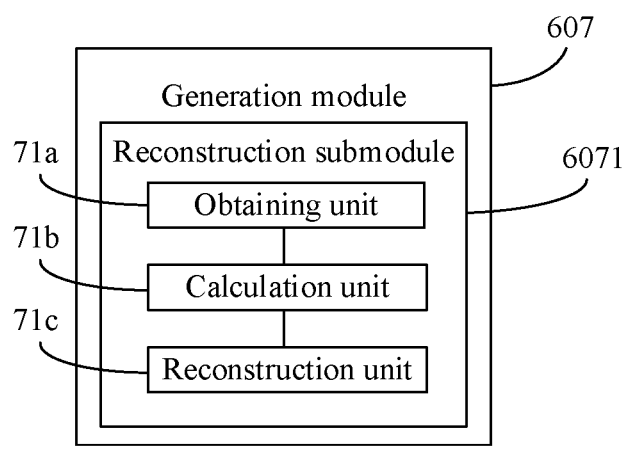
FIG. 7D is a schematic structural diagram of a generation module according to an embodiment of this disclosure.

Optionally, as shown in FIG. 7D, the generation module 607 may include:

a reconstruction submodule 6071, configured to execute an alarm event reconstruction procedure for each to-be-processed alarm log set, where the alarm event reconstruction process includes:

an obtaining unit 71a is configured to: for each alarm type in the to-be-processed alarm log set, obtain a target alarm log that is in the to-be-processed alarm log set and that is of the alarm type;

a calculation unit 71b is configured to separately calculate an occurrence time interval between every two target alarm logs in the to-be-processed alarm log set that are adjacent in the time sequence; and a reconstruction unit 71c is configured to reconstruct, into one alarm event based on the occurrence time interval between every two target alarm logs, target alarm logs in the to-be-processed alarm log set that belong to a same alarm event.

The reconstruction unit may be configured to:

calculate an estimated time interval between two target alarm logs by using an exponential moving average method, where the two target alarm logs are any two target alarm logs that are adjacent in the time sequence, the two target alarm logs include a first alarm log and a second alarm log, and the first alarm log is generated before the second alarm log;

determine whether the occurrence time interval between the two target alarm logs and the estimated time interval meet a preset condition; and when the occurrence time interval between the two target alarm logs and the estimated time interval meet the preset condition, determine that the second alarm log belongs to an alarm event to which the first alarm log belongs, and aggregate the second alarm log into the alarm event to which the first alarm log belongs; or when the occurrence time interval between the two target alarm logs and the estimated time interval do not meet the preset condition, determine that the second alarm log does not belong to an alarm event to which the first alarm log belongs.

Optionally, the occurrence time interval $s_k$ between the two target alarm logs is $s_k = t_k - t_{k-1}$, the estimated time interval $s_k'$ is $s_k' = \alpha * s_{k-1} + (1-\alpha) * s'_{k-1}$, and the preset condition is $s_k \leq \beta * s_k'$, where $t_k$ is a generation time stamp of the second alarm log, $t_{k-1}$ is a generation time stamp of the first alarm log, $0 \leq \alpha \leq 1$, k is an integer greater than 1, and $\beta$ is a positive number.

Further, the reconstruction unit may be further configured to:

when the occurrence time interval between the two target alarm logs is less than or equal to a preset minimum time interval threshold, determine that the second alarm log belongs to the alarm event to which the first alarm log belongs; or when the occurrence time interval between the two target alarm logs is greater than a preset maximum time interval threshold, determine that the second alarm log does not belong to the alarm event to which the first alarm log belongs, where $s_{min} \leq \beta * s_k' \leq s_{max}$, $s_{min}$ is the minimum time interval threshold, and $s_{max}$ is the maximum time interval threshold.

Optionally, the reconstruction unit may be further configured to:

end reconstruction of the alarm event to which the first alarm log belongs, and initialize a new alarm event; and aggregate the second alarm log into the new alarm event.

Optionally, the alarm event includes the alarm type, and at least one of a start occurrence moment, an end occurrence moment, an average occurrence time interval, and a quantity of occurrence times of the alarm log in the alarm event.

Optionally, the compression module may be configured to:

compress the at least one alarm event based on the at least one association rule, to obtain at least one target alarm event, where each target alarm event is used to indicate an alarm log whose alarm type is the root cause alarm type.

Figure 7E:
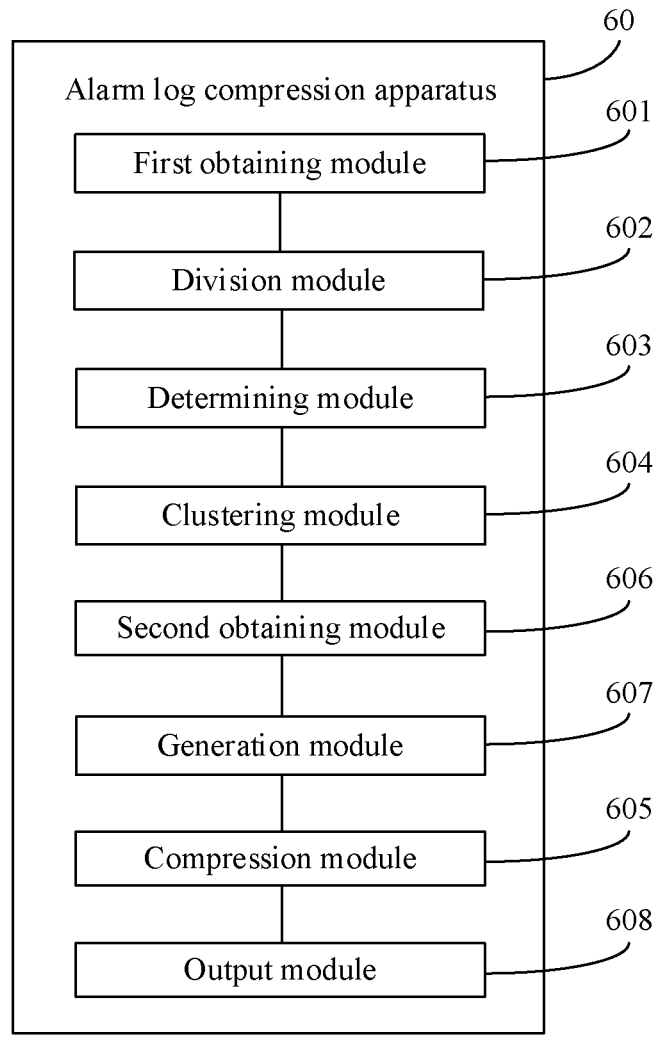
FIG. 7E is a schematic structural diagram of still another alarm log compression apparatus according to an embodiment of this disclosure.

Further, as shown in FIG. 7E, the apparatus 60 may further include:

an output module 608, configured to output the at least one target alarm event, to display the at least one target alarm event to a network monitoring engineer.

Optionally, the second network device and the first network device are a same network device; or the second network device and the first network device are different network devices of a same type.

In conclusion, according to the alarm log compression apparatus provided in the embodiments of this disclosure, the association rule is mined based on a temporal correlation between alarm types. In a mining process, only alarm types in the plurality of historical alarm log subsets obtained through division performed based on the generation time stamp should be traversed, and then a correspondence between each alarm type and the plurality of historical alarm log subsets is determined, for example, after the time sequence vector of each alarm type is determined, clustering processing may be performed on the alarm type based on the correspondence, to generate the association rule. In comparison with a related technology, in this disclosure, the historical alarm logs do not need to be traversed for a plurality of times, and association rule mining efficiency is improved. In addition, in this disclosure, a quantity of association rules mined based on the temporal correlation between the alarm types is far less than a quantity of association rules mined based on a frequent itemset in the related technology. Therefore, time costs are reduced in a process of determining accuracy of an association rule and a process of determining a root cause alarm type in the association rule. In addition, the alarm event is reconstructed based on an occurrence time interval of the alarm log, and finally, the target alarm event used to indicate the alarm log whose alarm type is the root cause alarm type is displayed to the network monitoring engineer. This greatly reduces alarm log information presented to the network monitoring engineer, and ensures information accuracy and fidelity.

Figure 8:
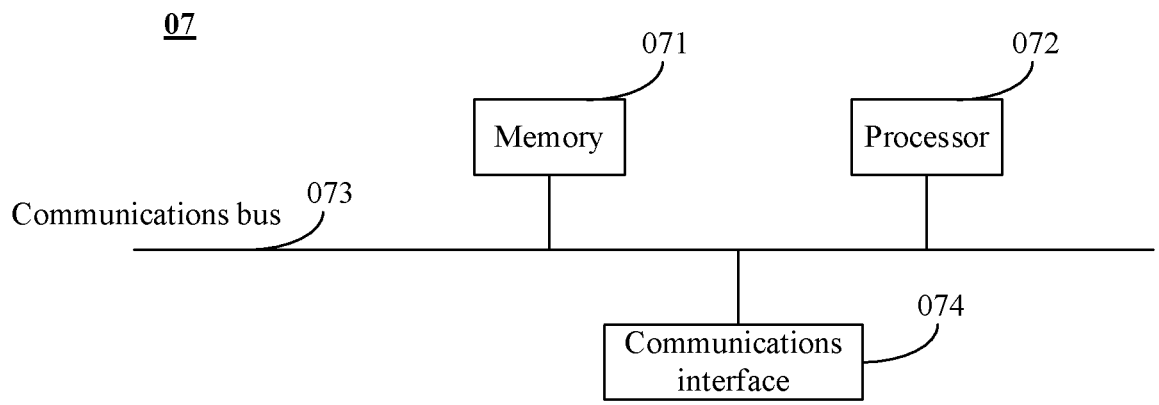
FIG. 8 is a schematic structural diagram of an entity of an alarm log compression apparatus according to an embodiment of this disclosure.

An embodiment of this disclosure provides an alarm log compression apparatus. As shown in FIG. 8, the apparatus 07 includes a memory 071, a processor 072, and a computer program that is stored in the memory 071 and that can be run on the processor 072, and when the processor 072 executes the computer program, the alarm log compression methods in the method embodiments of this disclosure are implemented.

Optionally, the apparatus 07 further includes a communications bus 073 and a communications interface 074.

The processor 072 includes one or more processing cores. The processor 072 runs the computer program and a unit, to perform various functional applications and data processing.

The memory 071 may be configured to store the computer program and the unit. Specifically, the memory may store an operating system and an application program unit required for at least one function. The operating system may be an operating system such as a real-time operating system (Real Time eXecutive, RTX), LINUX, UNIX, WINDOWS, or OS X.

There may be a plurality of communications interfaces 074, and the communications interface 074 is configured to communicate with another storage device or network device. For example, in this embodiment of this disclosure, the communications interface 074 may be configured to receive an alarm log sent by a network device in a communications network.

The memory 071 and the communications interface 074 are separately connected to the processor 072 by using a communications cable 073.

An embodiment of this disclosure provides a computer-readable storage medium. The computer-readable storage medium stores an instruction, and when the instruction is executed by a processor, the alarm log compression methods in the method embodiments of this disclosure are implemented.

A person of ordinary skill in the art may understand that all or some of the blocks of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, or improvement made without departing from the spirit and principle of this disclosure should fall within the protection scope of this disclosure.

What is claimed is:

1. A method, comprising:

obtaining a historical alarm log set generated by a first network device in a communications network, wherein the historical alarm log set comprises a plurality of historical alarm logs, and each historical alarm log comprises an alarm type and a time stamp;

dividing the historical alarm log set into a plurality of historical alarm log subsets based on the time stamps of the historical alarm logs in the historical alarm log set, wherein all historical alarm logs in each historical alarm log subset are consecutive in a time sequence, and a union set of the plurality of historical alarm log subsets comprises all the historical alarm logs in the historical alarm log set;

obtaining all alarm types in the historical alarm log set, to obtain a first alarm type set;

determining a time sequence vector of each alarm type in the first alarm type set, wherein each time sequence vector indicates a correspondence between a corresponding alarm type and the plurality of historical alarm log subsets;

performing clustering processing on the alarm types in the historical alarm log set based on the correspondence, to generate a set of association rules, wherein each association rule in the set of association rules comprises a root cause alarm type and at least one minor alarm type that are associated with each other, and the set of association rules is used for obtaining an alarm log whose alarm type is the root cause alarm type.

2. The method of claim 1, wherein for the time sequence vector corresponding to each alarm type, values in the time sequence vector are in a one-to-one correspondence with the plurality of historical alarm log subsets, the values in the time sequence vector comprise at least one of a first value and a second value, the first value is used to indicate that the alarm type exists in a corresponding historical alarm log subset, the second value is used to indicate that the alarm type does not exist in a corresponding historical alarm log subset, and the first value is different from the second value.

3. The method of claim 2, wherein determining the time sequence vector of each alarm type in the first alarm type set comprises:
   executing a time sequence vector determining procedure for each alarm type in the first alarm type set, wherein the time sequence vector determining procedure comprises:
   sequentially detecting whether the alarm type exists in the plurality of historical alarm log subsets; and
   determining the time sequence vector of the alarm type based on a detection result.

4. The method of claim 2, wherein performing clustering processing on the alarm types in the historical alarm log set based on the correspondence, to generate the set of association rules comprises:
   performing clustering processing on all the alarm types in the first alarm type set based on the time sequence vectors of all the alarm types, to generate the set of association rules.

5. The method of claim 4, wherein performing clustering processing on all the alarm types in the first alarm type set based on the time sequence vectors of all the alarm types, to generate the set of association rules comprises:
   performing a clustering operation on the first alarm type set, wherein the clustering operation comprises:
   setting a target alarm type set and a second alarm type set, wherein both the target alarm type set and the second alarm type set are empty sets;
   adding any alarm type in the first alarm type set to the target alarm type set, and deleting, from the first alarm type set, the respective alarm type added to the target alarm type set;
   performing a determining procedure repeatedly until the first alarm type set becomes an empty set, and determining the target alarm type set as an association rule; and
   after performing the determining procedure repeatedly, when the second alarm type set is not an empty set, performing the clustering operation repeatedly by using the second alarm type set as a new first alarm type set; or
   after performing the determining procedure repeatedly, when the second alarm type set is an empty set, stopping performing the clustering operation; and
   the determining procedure comprises:
   calculating a correlation between a alarm type and the target alarm type set based on a time sequence vector of the alarm type and time sequence vectors of all alarm types in the target alarm type set, wherein the alarm type is any alarm type in the first alarm type set other than the alarm types in the target alarm type set; and
   when the correlation is greater than a preset correlation threshold, adding the alarm type to the target alarm type set, to obtain an updated target alarm type set, and deleting the alarm type from the first alarm type set; or
   when the correlation is not greater than the preset correlation threshold, adding the alarm type to the second alarm type set, and deleting the to be processed alarm type from the first alarm type set.

6. The method of claim 4, wherein performing the clustering processing on all the alarm types in the first alarm type set based on the time sequence vectors of all the alarm types, to generate the set of association rules comprises:
   marking a target alarm type in the first alarm type set, wherein the target alarm type is any alarm type in the first alarm type set; and
   performing a clustering operation on the first alarm type set, wherein the clustering operation comprises:
   executing a determining procedure repeatedly until all the alarm types in the first alarm type set are traversed; and
   after executing a determining procedure repeatedly, when there is an alarm type for which no mark is set in the first alarm type set, determining, as a new target alarm type, any alarm type for which no mark is set, marking the new target alarm type, and performing the clustering operation repeatedly, wherein different target alarm types have different marks; or
   after executing a determining procedure repeatedly, when there is no alarm type for which no mark is set in the first alarm type set, stopping performing the clustering operation, and generating the at least one association rule based on the first alarm type set, wherein a same mark is set for all alarm types in each association rule; and
   the determining procedure comprises:
   determining, as a target alarm type set, a set comprising all alarm types in the first alarm type set that have the same mark as the target alarm type;
   calculating a correlation between a alarm type and the target alarm type set based on a time sequence vector of the alarm type and time sequence vectors of all the alarm types in the target alarm type set, wherein the alarm type is any alarm type in the first alarm type set other than the alarm types in the target alarm type set; and
   marking the alarm type when the correlation is greater than a preset correlation threshold, wherein a mark of the alarm type is the same as a mark of the target alarm type.

7. The method of claim 1, wherein obtaining the historical alarm log set generated by the first network device in the communications network comprises:
   preprocessing a historical alarm log generated by the first network device in a first preset time period, to remove redundant information from each historical alarm log, to obtain the historical alarm log set.

8. The method of claim 1, wherein
   each historical alarm log is represented in a 2-tuple (M, t) format, M represents alarm log information, t represents the time stamp, and the alarm log information comprises at least an alarm type field and an identifier field of the first network device.

9. The method of claim 1, wherein the historical alarm logs in the historical alarm log set have a time partial order relation, and dividing the historical alarm log set into the plurality of historical alarm log subsets based on the time stamps of the historical alarm logs in the historical alarm log set comprises:
   obtaining a time stamp set of the historical alarm logs in the historical alarm log set; and
   classifying the historical alarm logs into the plurality of historical alarm log subsets based on the time stamp set, a preset time window length, and a window sliding step by using a sliding window technique, wherein the window sliding step is not greater than the time window length.

10. The method of claim 1, wherein the method further comprises:
compressing a plurality of alarm logs based on the set of association rules, to obtain an alarm log whose alarm type is the root cause alarm type.

11. The method of claim 10, wherein before compressing the plurality of alarm logs, the method further comprises:
obtaining a alarm log set generated by a second network device in the communications network in a second preset time period, wherein the alarm log set comprises the plurality of alarm logs, and each alarm log comprises an alarm type and a time stamp; and
generating at least one alarm event based on the alarm log set, wherein each alarm event is used to indicate alarm logs of a same alarm type that are generated by the second network device;
the compressing the plurality of alarm logs comprises:
compressing the at least one alarm event based on the set of association rules, to obtain at least one target alarm event, wherein each target alarm event is used to indicate an alarm log whose alarm type is the root cause alarm type.

12. The method of claim 11, wherein generating at least one alarm event based on the alarm log set comprises:
for each alarm type in the alarm log set, obtaining a target alarm log that is in the alarm log set and that is of the alarm type;
separately calculating an occurrence time interval between every two target alarm logs in the alarm log set that are adjacent in the time sequence; and
reconstructing, into one alarm event based on the occurrence time interval between every two target alarm logs, target alarm logs in the alarm log set that belong to a same alarm event.

13. The method of claim 12, wherein reconstructing, into one alarm event based on the occurrence time interval between every two target alarm logs, target alarm logs in the alarm log set that belong to a same alarm event comprises:
calculating an estimated time interval between two target alarm logs by using an exponential moving average method, wherein the two target alarm logs are any two target alarm logs that are adjacent in the time sequence, the two target alarm logs comprise a first alarm log and a second alarm log, and the first alarm log is generated before the second alarm log;
determining whether the occurrence time interval between the two target alarm logs and the estimated time interval meet a preset condition; and
when the occurrence time interval between the two target alarm logs and the estimated time interval meet the preset condition, determining that the second alarm log belongs to an alarm event to which the first alarm log belongs, and aggregating the second alarm log into the alarm event to which the first alarm log belongs; or
when the occurrence time interval between the two target alarm logs and the estimated time interval do not meet the preset condition, determining that the second alarm log does not belong to an alarm event to which the first alarm log belongs.

14. The method of claim 13, wherein after determining that the second alarm log does not belong to the alarm event to which the first alarm log belongs, the method further comprises:
ending reconstruction of the alarm event to which the first alarm log belongs, and initializing a new alarm event; and
aggregating the second alarm log into the new alarm event.

15. The method of claim 11, wherein
the alarm event comprises the alarm type, and at least one of a start occurrence moment, an end occurrence moment, an average occurrence time interval, and a quantity of occurrence times of the alarm log in the alarm event.

16. The method of claim 11, wherein after compressing the at least one alarm event, to obtain at least one target alarm event, the method further comprises:
outputting the at least one target alarm event.

17. The method of claim 11, wherein the second network device and the first network device are a same network device.

18. The method of claim 11, wherein the second network device and the first network device are different network devices of a same type.

19. An apparatus comprising:
a processor; and
a non-transitory computer readable medium which contains computer-executable instructions;
the processor is configured to execute the computer-executable instructions to enable the apparatus to perform operations comprising:
obtaining a historical alarm log set generated by a first network device in a communications network, wherein the historical alarm log set comprises a plurality of historical alarm logs, and each historical alarm log comprises an alarm type and a time stamp;
dividing the historical alarm log set into a plurality of historical alarm log subsets based on the time stamps of the historical alarm logs in the historical alarm log set, wherein all historical alarm logs in each historical alarm log subset are consecutive in a time sequence, and a union set of the plurality of historical alarm log subsets comprises all the historical alarm logs in the historical alarm log set;
obtaining all alarm types in the historical alarm log set, to obtain a first alarm type set;
determining a time sequence vector of each alarm type in the first alarm type set, wherein each time sequence vector indicates a correspondence between a corresponding alarm type and the plurality of historical alarm log subsets;
performing clustering processing on the alarm types in the historical alarm log set based on the correspondence, to generate a set of association rules, wherein each association rule in the set of association rules comprises a root cause alarm type and at least one minor alarm type that are associated with each other, and the set of association rules is used for obtaining an alarm log whose alarm type is the root cause alarm type.

20. A non-transitory computer readable medium which contains computer-executable instructions, wherein the computer-executable instructions, when executed by a processor, enables an apparatus to perform operations comprising:
obtaining a historical alarm log set generated by a first network device in a communications network, wherein the historical alarm log set comprises a plurality of historical alarm logs, and each historical alarm log comprises an alarm type and a time stamp;
dividing the historical alarm log set into a plurality of historical alarm log subsets based on the time stamps of the historical alarm logs in the historical alarm log set, wherein all historical alarm logs in each historical alarm log subset are consecutive in a time sequence, and a union set of the plurality of historical alarm log subsets comprises all the historical alarm logs in the historical alarm log set;

obtaining all alarm types in the historical alarm log set, to obtain a first alarm type set;

determining a time sequence vector of each alarm type in the first alarm type set, wherein each time sequence vector indicates a correspondence between a corresponding alarm type and the plurality of historical alarm log subsets;

performing clustering processing on the alarm types in the historical alarm log set based on the correspondence, to generate a set of association rules, wherein each association rule in the set of association rules comprises a root cause alarm type and at least one minor alarm type that are associated with each other, and the set of association rules is used for obtaining an alarm log whose alarm type is the root cause alarm type.

* * * * *